(12) United States Patent
Dave et al.

(10) Patent No.: US 12,694,033 B2
(45) Date of Patent: Jul. 28, 2026

(54) ENTITY-AWARE MULTI-TASK MACHINE LEARNING

(71) Applicant: Walmart Apollo, LLC, Bentonville, AR (US)

(72) Inventors: Vachik Shailesh Dave, San Jose, CA (US); Zhiyuan Peng, San Jose, CA (US); Rahul Devendra Sharnagat, Sunnyvale, CA (US); Nicole Isabel McNabb, Sunnyvale, CA (US); Yi Fang, San Jose, CA (US); Ciya Liao, Fremont, CA (US); Krishna Sravanthi Rajanala Sai, Dublin, CA (US); Alessandro Magnani, Palo Alto, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 19/078,662

(22) Filed: Mar. 13, 2025

(65) Prior Publication Data

US 2025/0291803 A1 Sep. 18, 2025

Related U.S. Application Data

(60) Provisional application No. 63/565,259, filed on Mar. 14, 2024.

(51) Int. Cl.
 *G06F 16/2457* (2019.01)
 *G06F 16/22* (2019.01)
 (Continued)

(52) U.S. Cl.
 CPC ...... *G06F 16/2457* (2019.01); *G06F 16/2237* (2019.01); *G06F 16/242* (2019.01); *G06F 16/288* (2019.01)

(58) Field of Classification Search
 CPC .. G06F 16/2237; G06F 16/242; G06F 16/243; G06F 16/2457; G06F 16/288;
 (Continued)

(56) References Cited

U.S. PATENT DOCUMENTS

| | | | |
|---|---|---|---|
| 2022/0129633 A1* | 4/2022 | Shah | G06F 40/295 |
| 2022/0277143 A1* | 9/2022 | Jayarao | G06N 20/00 |

(Continued)

OTHER PUBLICATIONS

Wu et al. "A Multi-task Learning Framework for Product Ranking with BERT." In Proceedings of the ACM Web Conference 2022 (WWW '22). 2022. Association for Computing Machinery, New York, NY, USA, 493-501. (Year: 2022).*

(Continued)

*Primary Examiner* — James E Richardson
(74) *Attorney, Agent, or Firm* — Morgan, Lewis & Bockius LLP; Manita Rawat

(57) ABSTRACT

Examples may be related to entity-aware multi-task machine learning. An example may involve: obtaining a search query; retrieving, using an entity retrieval model, at least one entity based on the search query; generating, using a neural network, query embedding data based on the search query and the at least one entity; generating, using a plurality of task-specific networks, task prediction data for a plurality of tasks based on the query embedding data, wherein each task of the plurality of tasks captures a different aspect of a user intent associated with the search query; and generating at least one search result for the search query based on the task prediction data for the plurality of tasks.

20 Claims, 14 Drawing Sheets

(51) Int. Cl.
   G06F 16/242 (2019.01)
   G06F 16/28 (2019.01)
(58) Field of Classification Search
   CPC ........ G06F 40/295; G06F 40/30; G06F 40/35;
   G06N 3/08
   See application file for complete search history.

(56) References Cited

U.S. PATENT DOCUMENTS

| | | | |
|---|---|---|---|
| 2022/0365955 A1* | 11/2022 | Ramamohan | G06N 3/04 |
| 2023/0186351 A1* | 6/2023 | Dhamija | G06Q 30/0276 |
| | | | 705/14.72 |
| 2025/0315721 A1* | 10/2025 | Power | G06N 3/045 |

OTHER PUBLICATIONS

Zhang et al., "A Survey on Multi-Task Learning," in IEEE Transactions on Knowledge and Data Engineering, vol. 34, No. 12, pp. 5586-5609, Dec. 1, 2022, doi: 10.1109/TKDE.2021.3070203. (Year: 2022).*

Q. Jia et al., "Context-Aware Deep Model for Entity Recommendation System in Search Engine at Alibaba," https://arxiv.org/pdf/1909.04493, Sep. 6, 2019, 8 pages.

J. Huang et al., "Improving Entity Recommendation with Search Log and Multi-Task Learning," Proceedings of the Twenty-Seventh International Joint Conference on Artificial Intelligence (IJCAI-18), Jul. 2018, 9 pages.

X. Sheng et al., "Joint Optimization of Ranking and Calibration with Contextualized Hybrid Model," Proceedings of the 29th ACM SIGKDD Conference on Knowledge Discover and Data Mining (KDD '23), (Year: 2023), 10 pages.

Peng, Zhiyuan; "Entity-aware Multi-task Learning for Query Understanding at Walmart"; Aug. 4, 2023; https://doi.org/10.1145/3580305.3599816 In Proceedings of the 29th ACM SIGKDD Conference on Knowledge Discovery and Data Mining (KDD '23) . ACM, New York, NY, USA.

* cited by examiner

300

600

700-1

700-2

700-3

<u>800</u>

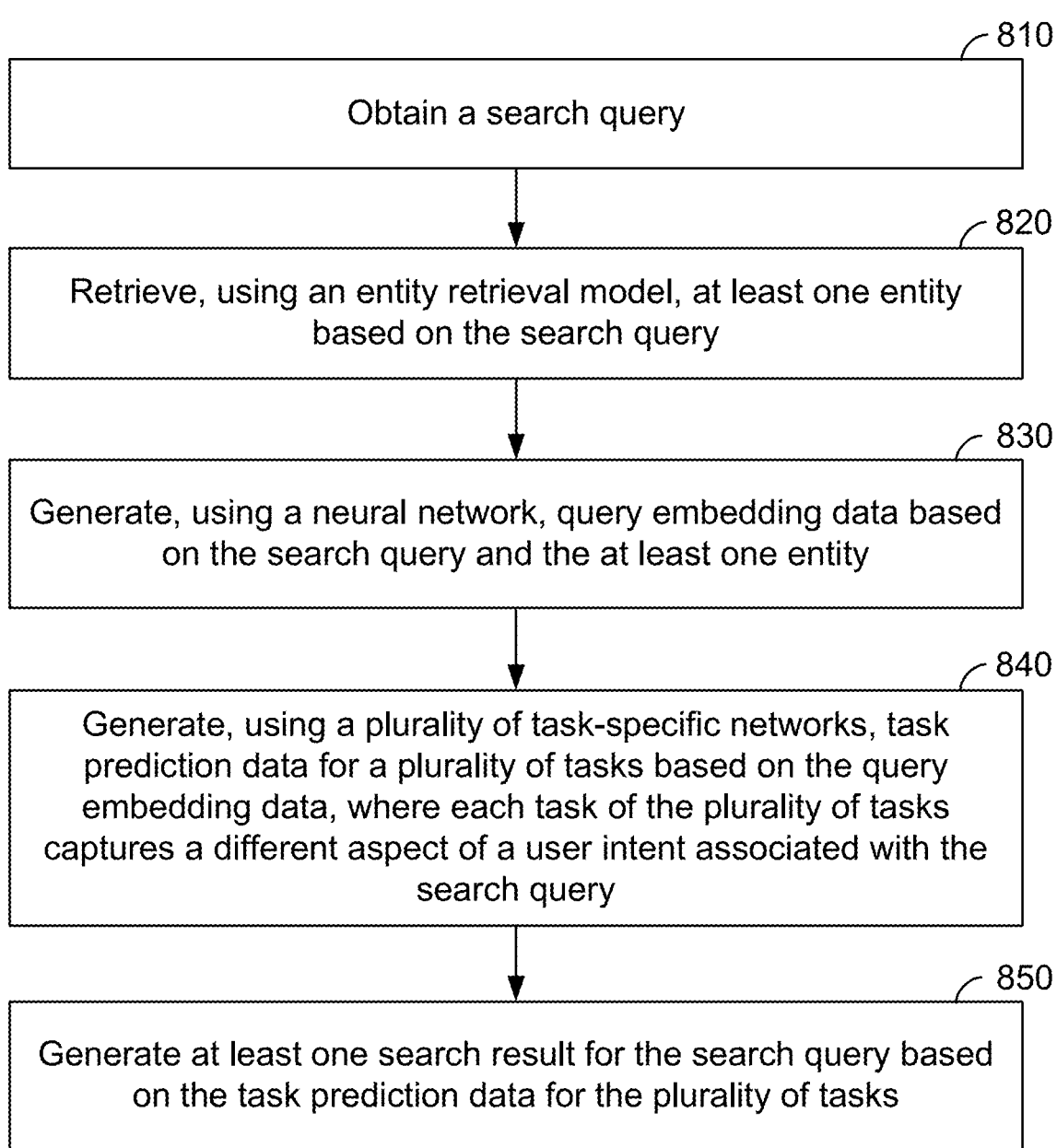

810

Obtain a search query

820

Retrieve, using an entity retrieval model, at least one entity based on the search query

830

Generate, using a neural network, query embedding data based on the search query and the at least one entity

840

Generate, using a plurality of task-specific networks, task prediction data for a plurality of tasks based on the query embedding data, where each task of the plurality of tasks captures a different aspect of a user intent associated with the search query

850

Generate at least one search result for the search query based on the task prediction data for the plurality of tasks

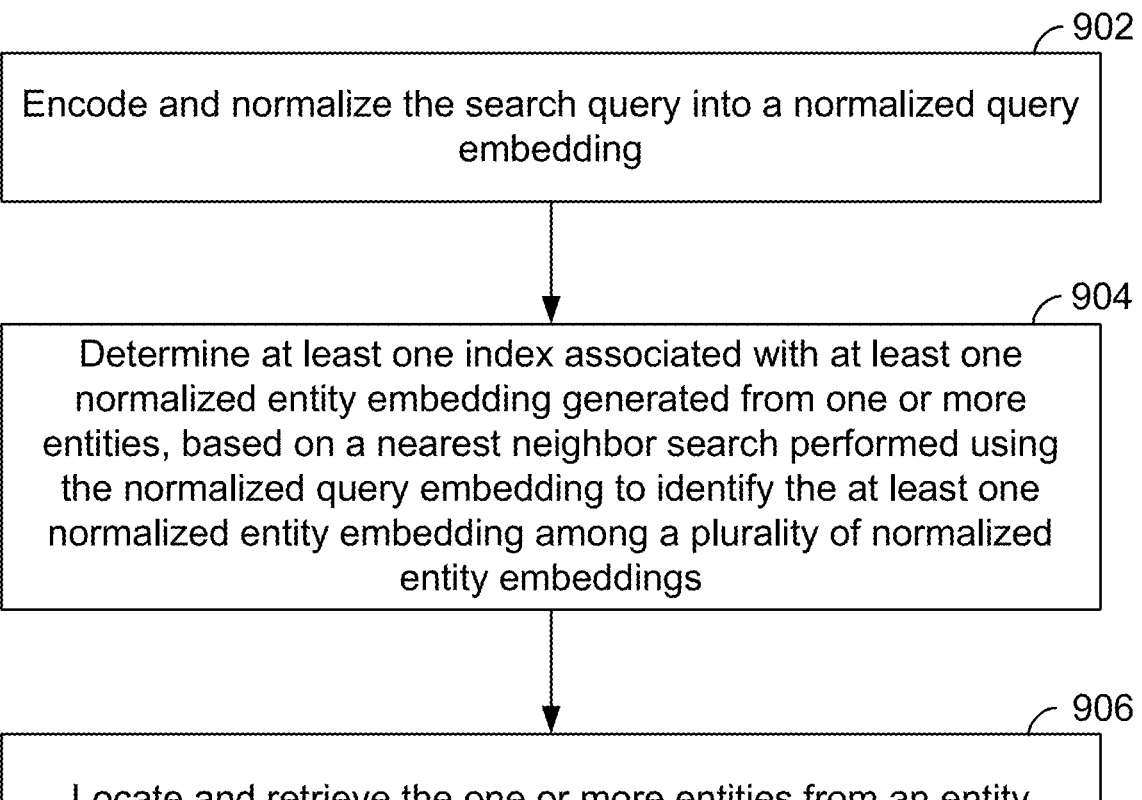

Encode and normalize the search query into a normalized query
embedding

902

Determine at least one index associated with at least one
normalized entity embedding generated from one or more
entities, based on a nearest neighbor search performed using
the normalized query embedding to identify the at least one
normalized entity embedding among a plurality of normalized
entity embeddings

904

Locate and retrieve the one or more entities from an entity
database based on the at least one index

Figure 10:
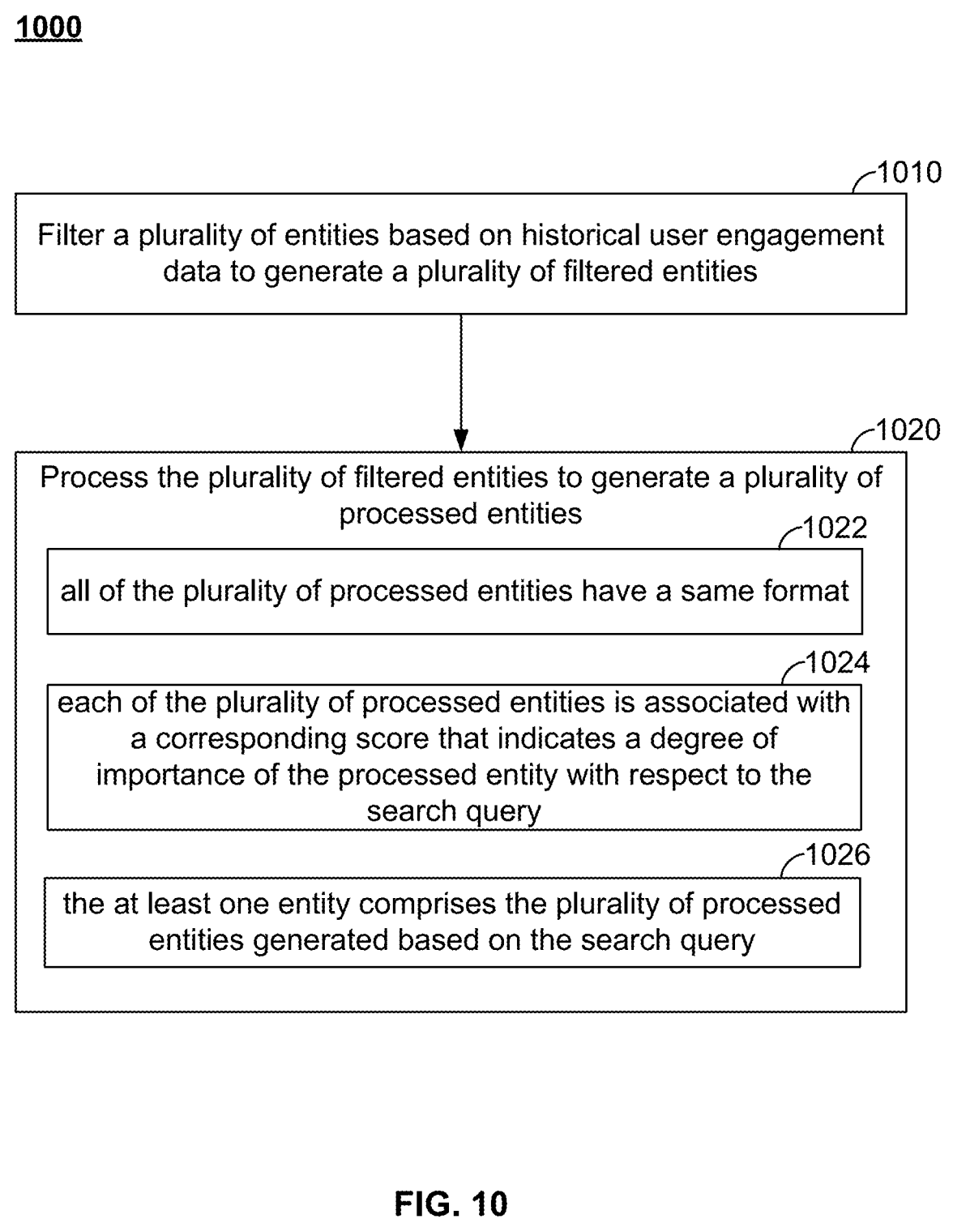

Filter a plurality of entities based on historical user engagement data to generate a plurality of filtered entities

1020

Process the plurality of filtered entities to generate a plurality of processed entities

1022 all of the plurality of processed entities have a same format

1024 each of the plurality of processed entities is associated with a corresponding score that indicates a degree of importance of the processed entity with respect to the search query

1026 the at least one entity comprises the plurality of processed entities generated based on the search query

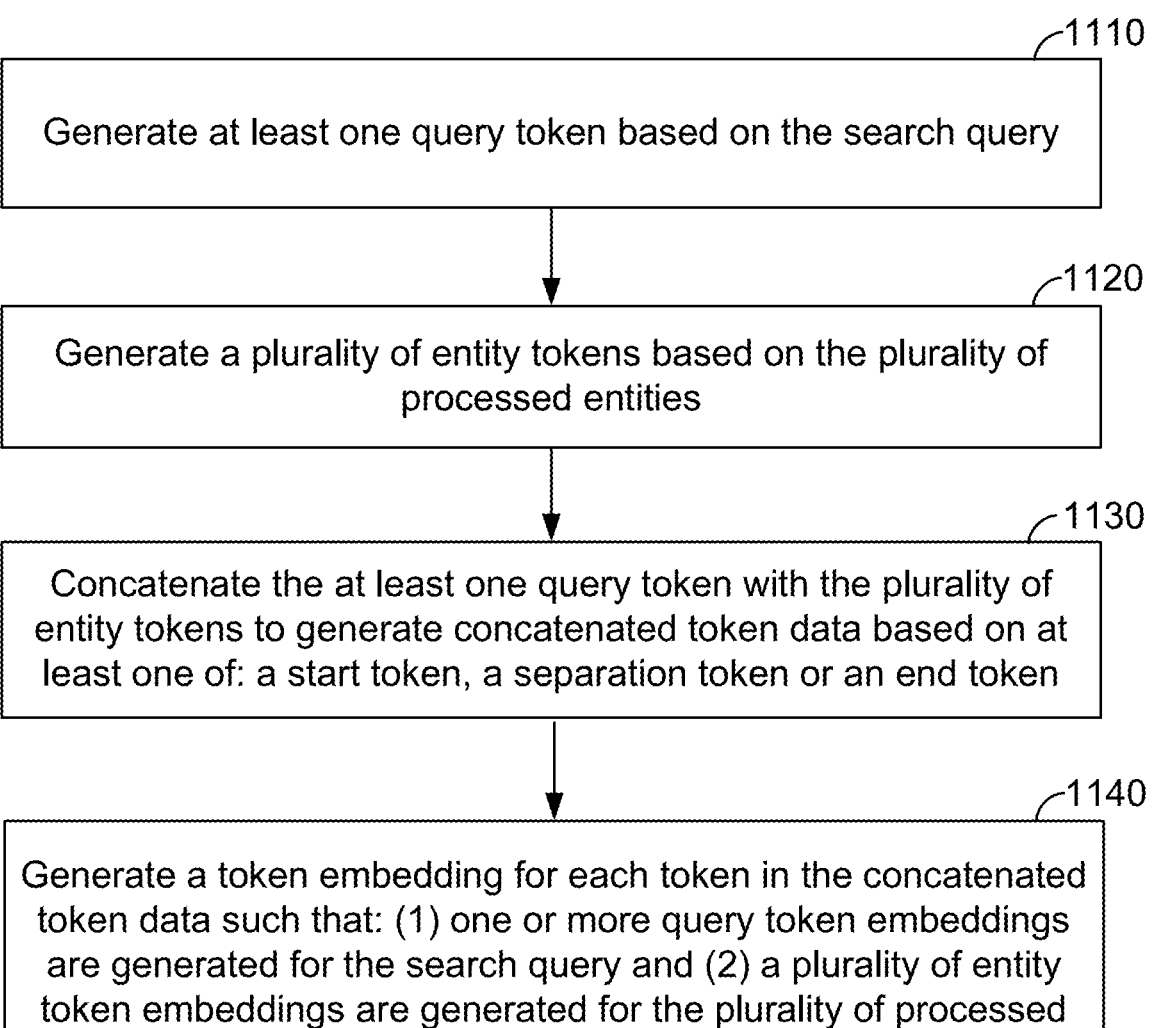

1110

Generate at least one query token based on the search query

1120

Generate a plurality of entity tokens based on the plurality of processed entities

1130

Concatenate the at least one query token with the plurality of entity tokens to generate concatenated token data based on at least one of: a start token, a separation token or an end token

1140

Generate a token embedding for each token in the concatenated token data such that: (1) one or more query token embeddings are generated for the search query and (2) a plurality of entity token embeddings are generated for the plurality of processed entities, where the query embedding data for the search query includes the one or more query token embeddings

FIG. 11

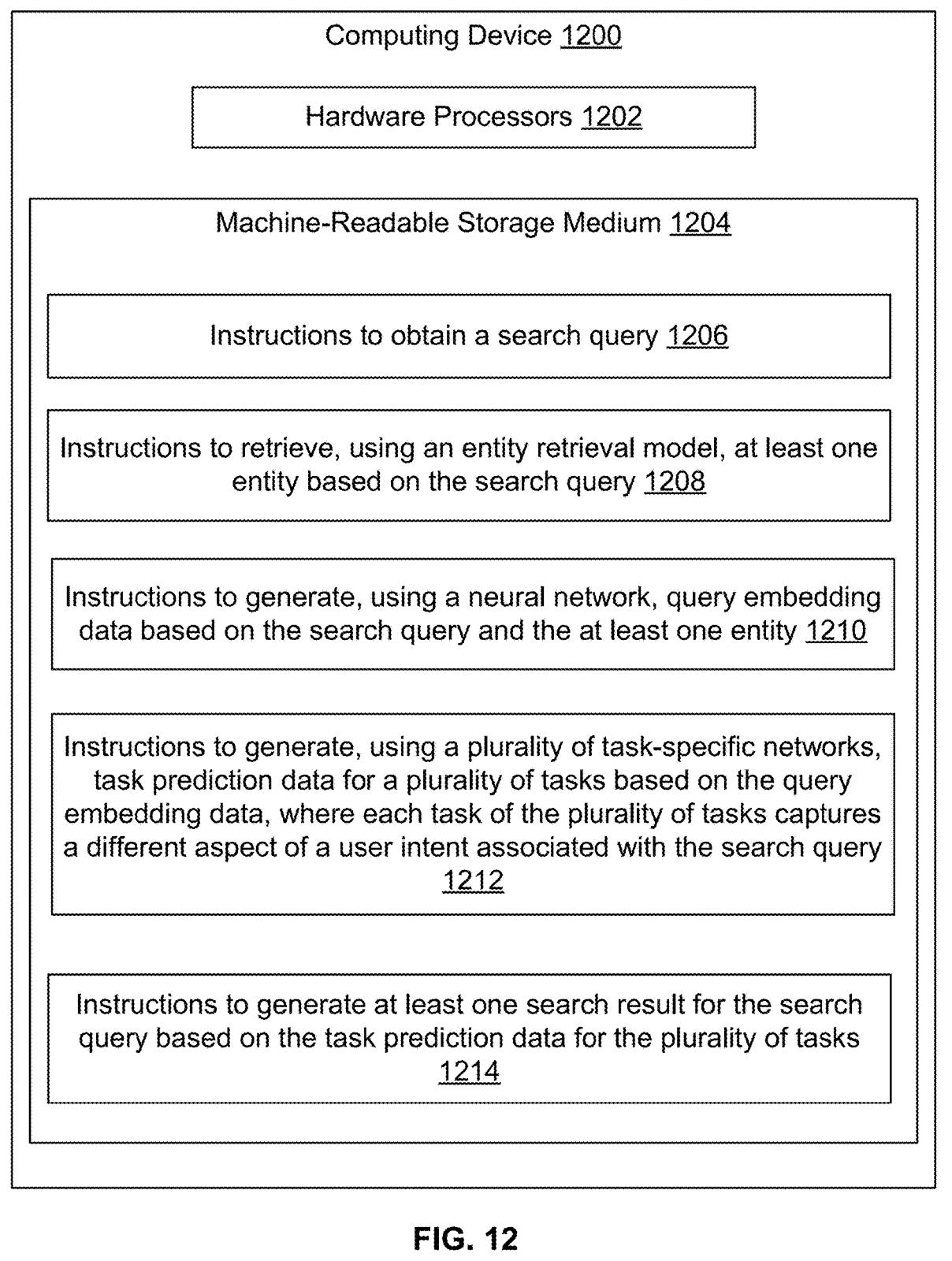

Computing Device <u>1200</u>

Hardware Processors <u>1202</u>

Machine-Readable Storage Medium <u>1204</u>

Instructions to obtain a search query <u>1206</u>

Instructions to retrieve, using an entity retrieval model, at least one entity based on the search query <u>1208</u>

Instructions to generate, using a neural network, query embedding data based on the search query and the at least one entity <u>1210</u>

Instructions to generate, using a plurality of task-specific networks, task prediction data for a plurality of tasks based on the query embedding data, where each task of the plurality of tasks captures a different aspect of a user intent associated with the search query <u>1212</u>

Instructions to generate at least one search result for the search query based on the task prediction data for the plurality of tasks <u>1214</u>

FIG. 12

ENTITY-AWARE MULTI-TASK MACHINE LEARNING

CROSS-REFERENCE TO RELATED APPLICATION

This application claims benefit to U.S. Provisional Application No. 63/565,259, entitled "SYSTEMS AND METHODS FOR ENTITY-AWARE MULTI-TASK LEARNING FOR QUERY UNDERSTANDING," filed on Mar. 14, 2024, the disclosure of which is incorporated herein by reference in its entirety.

BACKGROUND

While a machine learning model can perform a learning task without explicit instructions, a learning project may include multiple learning tasks to be solved at the same time. For example, query understanding (QU) is a fundamental process in certain search engines for extracting intents of users, and typically includes a set of different tasks such as named entity recognition and query classification.

BRIEF DESCRIPTION OF THE DRAWINGS

Various examples will be described by the following detailed description of the example embodiments, which is to be considered together with the accompanying drawings wherein like numbers refer to like parts and further wherein:

FIG. 8 shows a flowchart illustrating an example method for query understanding using entity-aware multi-task machine learning, in accordance with some embodiments;

FIG. 9 shows a flowchart illustrating an example method for retrieving at least one entity, in accordance with some embodiments;

FIG. 10 shows a flowchart illustrating an example method for generating a plurality of processed entities, in accordance with some embodiments;

FIG. 11 shows a flowchart illustrating an example method for generating query embedding data, in accordance with some embodiments;

FIG. 12 depicts an example system with a machine-readable medium that includes instructions for entity-aware multi-task machine learning, in accordance with some embodiments.

DETAILED DESCRIPTION

Figure 1:
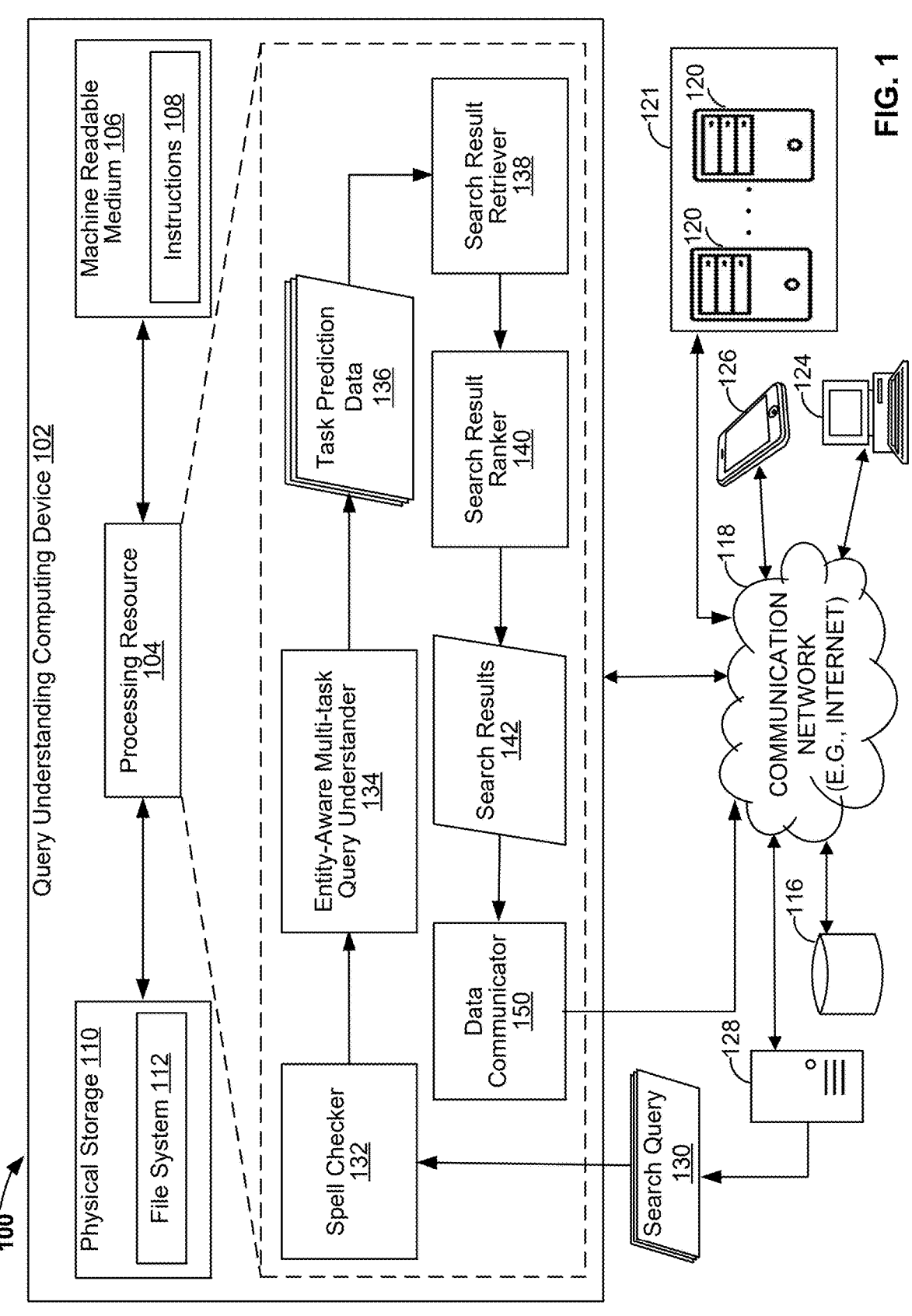
FIG. 1 depicts an example system for entity-aware multi-task machine learning, in accordance with some embodiments.

In some embodiments, systems and methods are described herein for entity-aware multi-task machine learning. For example, a disclosed machine learning model may solve multiple tasks at the same time for understanding a query based on entity information retrieved for the query.

In some examples, a query may be short textual elements containing several words indicating a user intent. Before searching a database based on the query, a search engine may perform query understanding to capture the user intent. The query understanding may include a plurality of tasks, e.g.: product type classification, query catalog classification, named entity recognition, term weighting, etc. Rather than applying a separate network to each task, which would lead to excessive workload for development and maintenance as well as increased latency and resource usage in large-scale network platforms, a multi-task learning approach is applied to query understanding according to various embodiments.

In some embodiments, one or more multi-task learning architectures may be applied for query understanding. In some examples, a large-scale entity-aware multi-task learning model can be used for query understanding by retrieving entities from engagement data as query context to augment query representation. The disclosed systems and methods can provide dramatic increases in key accuracy and latency metrics regarding query understanding compared to existing systems. In some embodiments, the large-scale entity-aware multi-task learning model is configured to learn the relative importance of retrieved entities by generating a listwise loss on the entities. The model can learn an improved entity context for each query to help the overall performance of query understanding tasks.

In some embodiments, the entity-aware multi-task learning approach enables several key advantages for query understanding processes. For example, the entity-aware multi-task learning enables a single launch for a combination of all models for individual query understanding tasks. This singe launch may increase development, decrease maintenance requirements, and enable measuring a unified impact of model changes. When a new feature is added to one or more models, the feature will be automatically incorporated to all predictions. Further, the single launch for a combination of all models saves the computational resources and memory footprint as all tasks share a significant portion of a single model. The disclosed systems and methods may be leveraged to transfer learning between different query understanding tasks to improve overall performance and alleviate potential overfitting on a single task.

In some embodiments, the training corpora of different tasks for query understanding includes queries having different labels, enabling application of a multi-task learning paradigm. For example, a semi-supervised learning via retrieval augmentation may be applied to learn from additional information extracted from the relevant engagement data for prediction to achieve improved performance. In various embodiments, a large-scale multi-task deep learning approach may be applied to model multiple query understanding tasks.

In some embodiments, systems and methods for multi-task learning include one or more trained multi-task learning models. The trained multi-task learning models may include one or more models configured to provide query understanding. In some embodiments, a multi-task deep neural network (MT-DNN) model is configured to utilize a Bidirectional Encoder Representations from Transformers (BERT) model as a shared structure between a plurality of learning tasks to learn expressive semantic embeddings that are provided to one or more subsequent models, such as, for example, one or more task-specific neural networks. A shared masked language model, such as a BERT model, may be trained on a complete dataset to enable information to be transferred among different tasks, where individual task-specific neural networks may be independently trained on subsets of the dataset. In some embodiments, not all the tasks update the parameters in the same direction.

In some embodiments, an entity-aware multi-task neural network, e.g. a BERT model, is shared by the plurality of tasks of query understanding to generate query embedding data for a query, based on an entity retrieved for the query. A plurality of task-specific networks may be configured to generate task prediction data for the plurality of tasks based on the query embedding data, and generate search results based on the task prediction data. While the entity-aware multi-task neural network is shared by the multiple tasks to save computational resource, entity information is utilized by the entity-aware multi-task neural network for accurate query understanding and search result generation.

In general, a trained function mimics cognitive functions that humans associate with other human minds. In particular, by training based on training data the trained function is able to adapt to new circumstances and to detect and extrapolate patterns. In general, parameters of a trained function may be adapted by means of training. In particular, a combination of supervised training, semi-supervised training, unsupervised training, reinforcement learning and/or active learning may be used. Furthermore, representation learning (an alternative term is "feature learning") may be used. In particular, the parameters of the trained functions may be adapted iteratively by several steps of training.

In some embodiments, one or more filtering and/or review processes may be implemented at various stages to identify and/or prevent generation of undesirable content by a natural language model or any other model. For example, one or more filtering processes may be applied to identify, remove, and/or otherwise eliminate undesirable content such as inappropriate content, offensive images, restricted images, etc. Although specific embodiments are discussed herein, it will be appreciated that any suitable filtering may be applied at any suitable steps of the disclosed methods.

In various embodiments, a system including a processor and a non-transitory memory storing instructions is disclosed. The instructions, when executed, cause the processor to: obtain a search query; retrieve, using an entity retrieval model, at least one entity based on the search query; generate, using a neural network, query embedding data based on the search query and the at least one entity; generate, using a plurality of task-specific networks, task prediction data for a plurality of tasks based on the query embedding data, wherein each task of the plurality of tasks captures a different aspect of a user intent associated with the search query; and generate at least one search result for the search query based on the task prediction data for the plurality of tasks.

In various embodiments, a computer-implemented method is disclosed. The computer-implemented method includes: obtaining a search query; retrieving, using an entity retrieval model, at least one entity based on the search query; generating, using a neural network, query embedding data based on the search query and the at least one entity; generating, using a plurality of task-specific networks, task prediction data for a plurality of tasks based on the query embedding data, wherein each task of the plurality of tasks captures a different aspect of a user intent associated with the search query; and generating at least one search result for the search query based on the task prediction data for the plurality of tasks.

In various embodiments, a non-transitory computer readable medium having instructions stored thereon is disclosed. The instructions, when executed by at least one processor, cause at least one device to perform operations including: obtaining a search query; retrieving, using an entity retrieval model, at least one entity based on the search query; generating, using a neural network, query embedding data based on the search query and the at least one entity; generating, using a plurality of task-specific networks, task prediction data for a plurality of tasks based on the query embedding data, wherein each task of the plurality of tasks captures a different aspect of a user intent associated with the search query; and generating at least one search result for the search query based on the task prediction data for the plurality of tasks.

This description of the example embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that enables the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

Turning to the drawings, FIG. 1 depicts an example system 100 for entity-aware multi-task machine learning, in accordance with some embodiments. The system 100 in this example includes a query understanding computing device 102 that detects user intent associated with a search query 130 and performs a search based on the search query 130 and the user intent.

In some embodiments, the query understanding computing device 102 includes a processing resource 104 that may include one or more microcontrollers, microprocessors, field-programmable gate arrays (FPGAs), application-specific integrated circuits (ASICs), state machines, digital circuitry, and/or any other suitable processing resource. The query understanding computing device 102 can also include a non-transitory machine readable medium 106 that may include one or more of a random access memory (RAM), read-only memory (ROM), electrically erasable programmable read-only memory (EEPROM), flash memory, hard disk, and/or any other suitable memory resource.

The processing resource 104 may execute instructions 108 (i.e., programming or software code) stored on machine readable medium 106 to perform functions of the query understanding computing device 102, such as retrieving an entity based on a search query, generating query embedding data based on the search query and the entity, generating task prediction data for a plurality of tasks based on the query embedding data, etc. The instructions 108 may include instructions for implementing one or more models. In some embodiments, and as will be described further herein below, the query understanding computing device 102 may execute one or more models, processes, or algorithms, such as a machine learning model, deep learning model, statistical model, etc., (e.g., as implemented as machine readable instructions) to perform entity-aware multi-task machine learning for query understanding.

The query understanding computing device 102 may also include other hardware components, such as physical storage 110. The physical storage 110 may include any physical storage device, such as a hard disk drive, a solid state drive, or the like, or a plurality of such storage devices (e.g., an array of disks), and may be locally attached (i.e., installed) in the query understanding computing device 102. In some implementations, the physical storage 110 may be accessed as a block storage device.

In some cases, the query understanding computing device 102 may also include a local file system 112 that may be implemented as a layer on top of the physical storage 110. For example, an operating system 112 may be executing on the query understanding computing device 102 (by virtue of the processing resource 104 executing certain instructions 108 related to the operating system) and the operating system 112 may provide a file system 112 to store data on the physical storage 110.

As shown in FIG. 1, the query understanding computing device 102 may communicate with a plurality of devices or systems over one or more network channels, illustrated as a network cloud 118. For example, in various embodiments, the query understanding computing device 102 may be in communication with a server 128 (e.g., a web server or an application server), a cloud-based engine 121 including one or more processing devices 120 that may be provisioned for use, a database 116, a workstation 124, and/or any other suitable system or device. The query understanding computing device 102 may similarly be in communication, either directly or indirectly, with one or more user computing devices 126 operatively coupled over the network 118. The other computing systems may be similar to the query understanding computing device 102, and may each include at least a processing resource and a machine readable medium.

In some examples, each of the query understanding computing device 102 and the processing devices 120 can be a computer, a workstation, a laptop, a server such as a cloud-based server, or any other suitable device. In some examples, each of the processing devices 120 is a server that includes one or more processing units, such as one or more graphical processing units (GPUs), one or more Tensor Processing Units (TPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing). For example, the cloud-based engine 121 may offer computing and storage resources of the one or more processing devices 120 to the query understanding computing device 102.

In some examples, each of the one or more user computing devices 126 can be a cellular phone, a smart phone, a tablet, a personal assistant device, a voice assistant device, a digital assistant, a laptop, a computer, a laser-based code scanner, or any other suitable device. In some examples, the server 128 hosts one or more websites or apps providing one or more products or services. In some examples, the query understanding computing device 102, the processing devices 120, and/or the server 128 are operated by a corporation, e.g. a big retailer, and the one or more user computing devices 126 are operated by customers, advertisers, associates or managers of the corporation. In some examples, the processing devices 120 are operated by a third party (e.g., a cloud-computing provider).

The workstation 124 may be operably coupled to the communication network 118 and can communicate with the query understanding computing device 102 over the communication network 118. In some examples, the workstation 124 may be located at a fulfillment node of a retailer, e.g. a store, a warehouse, a fulfillment center or a distribution center of the retailer.

Although FIG. 1 illustrates one user computing device 126, the system 100 can include any number of user computing devices 126. Similarly, the system 100 can include any number of the query understanding computing devices 102, the processing devices 120, the workstations 124, the servers 128, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

In some embodiments, the query understanding computing device 102 is further operable to communicate with the database 116 over the communication network 118. For example, the query understanding computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the query understanding computing device 102, in some examples, the database 116 can be a local storage device, such as a hard drive, a non-volatile memory, or a USB stick.

In some embodiments, a user submits a query (e.g. the search query 130) on a website hosted by a web server (e.g. the server 128). The web server may send the query to the query understanding computing device 102. In response to receiving the query, the query understanding computing device 102 may execute one or more processes to understand the query, perform a search based on the query understanding, and transmit the search results to the web server to be displayed. Alternatively, the web server may perform the search and display the search results based on the query understanding performed by the query understanding computing device 102. In various embodiments, the query can be received from the workstation 124 or one of the user computing devices 126, which will receive the search results from the web server.

As shown in FIG. 1, the processing resource 104 may include various components for query understanding. For example, the processing resource 104 may include a spell checker 132, an entity-aware multi-task query understander 134, a search result retriever 138, a search result ranker 140 and a data communicator 150.

In some examples, the spell checker 132 can receive the search query 130 and perform a spell check on the search query 130 to determine and correct any spelling error in the search query 130. For example, a submitted query "kung fu pandan" will be automatically corrected to be "kung fu panda" by the spell checker 132. The spell checker 132 may send the corrected query to the entity-aware multi-task query understander 134 for query understanding.

In some examples, the entity-aware multi-task query understander 134 obtains the search query from the spell checker 132 and retrieve, e.g. using an entity retrieval model, at least one entity based on the search query. Each entity may represent a product type associated with the search query. In some examples, most relevant entities are retrieved for the search query. The entity-aware multi-task query understander 134 can generate, e.g. using a neural network, query embedding data based on the search query and the at least one entity. Then using a plurality of task-specific networks, the entity-aware multi-task query understander 134 may generate task prediction data 136 for a plurality of tasks based on the query embedding data. Each task of the plurality of tasks captures a different aspect of a user intent associated with the search query for query understanding.

The search result retriever 138 in some examples can retrieve search results from a database, e.g. the database 116, based on the task prediction data for the plurality of tasks of query understanding. The search result ranker 140 may rank the retrieved search results to generate the final search results 142 listed according to a ranked order.

The data communicator 150 in some examples receives the search results 142 and transmits the search results 142 to one or more computing devices via the network cloud 118. For example, the search results 142 can be transmitted to the server 128, the workstation 124, the one or more user computing devices 126, etc. In some embodiments, transmitting the search results 142 to a computing device includes causing the computing device to present one or more user interface elements for displaying the search results according to the ranked order.

In some examples, the query understanding computing device 102 generates and/or updates different models (e.g., machine learning models, deep learning models, statistical models, algorithms, natural language models, etc.) for entity-aware multi-task machine learning. The query understanding computing device 102 may generate training data for the models based on data including but not limited to: historical queries, historical search result data, historical user interaction data, historical sales data, labelled query understanding data, and historical user feedback data. The query understanding computing device 102 trains the models based on their corresponding training data, and stores the models in a database, such as in the database 116 (e.g., a cloud storage). The models, when executed by the query understanding computing device 102, enable the query understanding computing device 102 to understand queries and perform search accordingly.

In some examples, the query understanding computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, the query understanding computing device 102 may perform query understanding and an entity-aware searching process.

Figure 2:
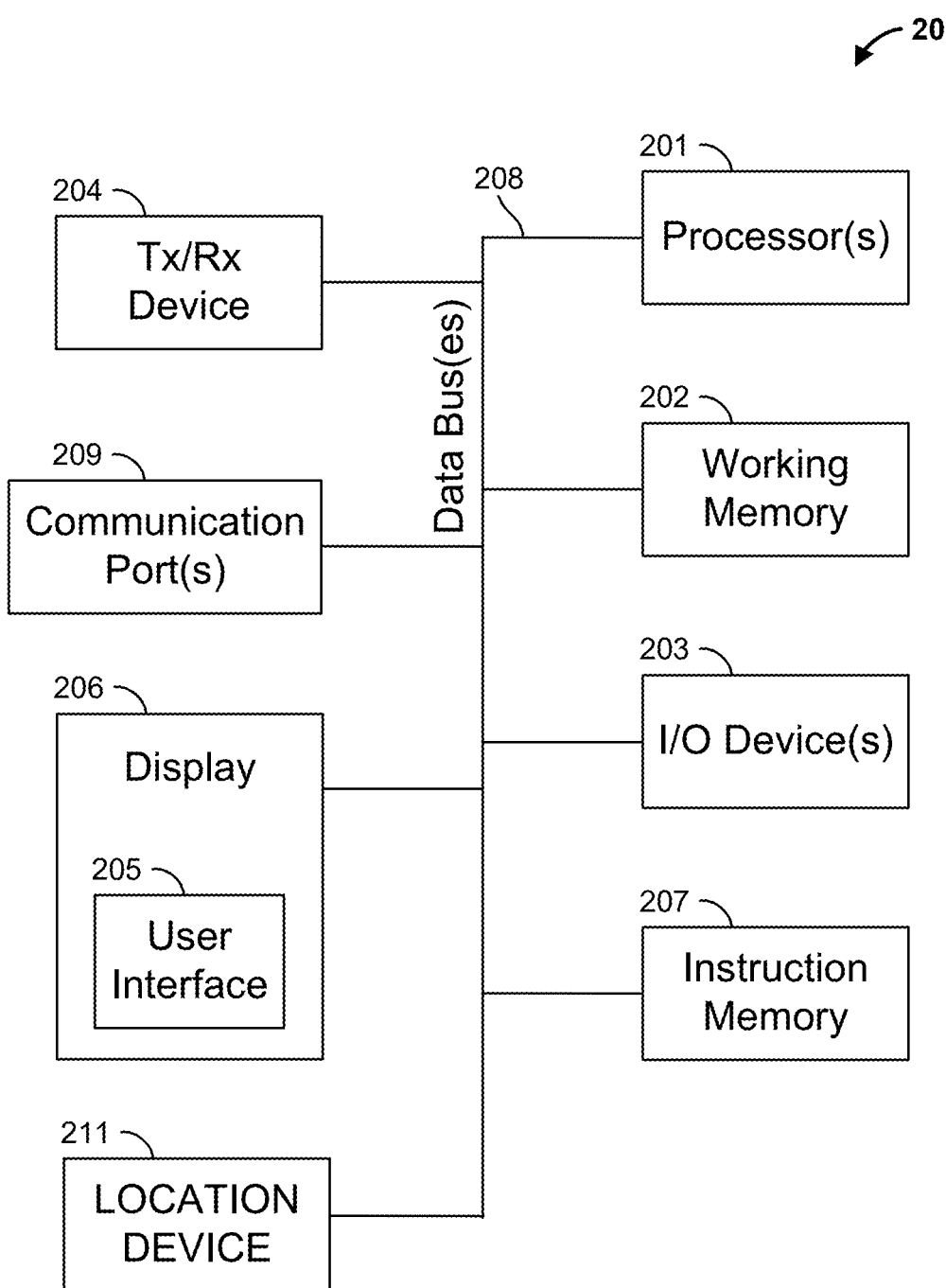
FIG. 2 depicts an example computer system that implements one or more of the disclosed processes, in accordance with some embodiments.

FIG. 2 illustrates a block diagram of a computing device 200, in accordance with some embodiments. In some embodiments, each of the query understanding computing device 102, the server 128, the workstation 124, the one or more user computing devices 126, and the one or more processing devices 120 in FIG. 1 may include the features shown in FIG. 2. Although FIG. 2 is described with respect to certain components shown therein, it will be appreciated that the elements of the computing device 200 can be combined, omitted, and/or replicated. In addition, it will be appreciated that additional elements other than those illustrated in FIG. 2 can be added to the computing device 200.

As shown in FIG. 2, the computing device 200 can include one or more processors 201, an instruction memory 207, a working memory 202, one or more input/output devices 203, one or more communication ports 209, a transceiver 204, a display 206 with a user interface 205, and an optional location device 211, all operatively coupled to one or more data buses 208. The data buses 208 enable communication among the various components. The data buses 208 can include wired, or wireless, communication channels.

The one or more processors 201 can include any processing circuitry operable to control operations of the computing device 200. In some embodiments, the one or more processors 201 include one or more distinct processors, each having one or more cores (e.g., processing circuits). Each of the distinct processors can have the same or different structure. The one or more processors 201 can include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 201 may also be implemented by a controller, a microcontroller, an application specific integrated circuit (ASIC), a field programmable gate array (FPGA), a programmable logic device (PLD), etc.

In some embodiments, the one or more processors 201 can implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 207 can store instructions that can be accessed (e.g., read) and executed by at least one of the one or more processors 201. For example, the instruction memory 207 can be a non-transitory, computer-readable storage medium such as a read-only memory (ROM), an electrically erasable programmable read-only memory (EE-PROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 201 can perform a certain function or operation by executing code, stored on the instruction memory 207, embodying the function or operation. For example, the one or more processors 201 can execute code stored in the instruction memory 207 to perform one or more of any function, method, or operation disclosed herein.

Additionally, the one or more processors 201 can store data to, and read data from, the working memory 202. For example, the one or more processors 201 can store a working set of instructions to the working memory 202, such as instructions loaded from the instruction memory 207. The one or more processors 201 can also use the working memory 202 to store dynamic data created during one or more operations. The working memory 202 can include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferro-electric polymer memory), phase-change memory (e.g., ovonic memory), ferroelectric memory, silicon-oxide-ni-tride-oxide-silicon (SONOS) memory, a removable disk, CD-ROM, any non-volatile memory, or any other suitable memory. Although embodiments are illustrated herein including separate instruction memory 207 and working memory 202, it will be appreciated that the computing device 200 can include a single memory unit to operate as both instruction memory and working memory. Further, although embodiments are discussed herein including non-volatile memory, it will be appreciated that the computing device 200 can include volatile memory components in addition to at least one non-volatile memory component.

In some embodiments, the instruction memory 207 and/or the working memory 202 includes an instruction set, in the form of a file for executing various methods, e.g. any method as described herein. The instruction set can be stored in any acceptable form of machine-readable instructions, including source code or various appropriate programming languages. Some examples of programming languages that can be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments, a compiler or interpreter can convert the instruction set into machine executable code for execution by the one or more processors 201.

The input-output devices 203 can include any suitable device that enables data input or output. For example, the input-output devices 203 can include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 204 and/or the communication port(s) 209 enable communication with a network. For example, if a communication network is a cellular network, the transceiver 204 enables communications with the cellular network. In some embodiments, the transceiver 204 is selected based on the type of the communication network 118 the computing device 200 will be operating in. The one or more processors 201 are operable to receive data from, or send data to, a network, via the transceiver 204.

The communication port(s) 209 may include any suitable hardware, software, and/or combination of hardware and software that is capable of coupling the computing device 200 to one or more networks and/or additional devices. The communication port(s) 209 can be arranged to operate with any suitable technique for controlling information signals using a desired set of communications protocols, services, or operating procedures. The communication port(s) 209 can include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 209 enables the programming of executable instructions in the instruction memory 207. In some embodiments, the communication port(s) 209 enables the transfer (e.g., uploading or downloading) of data, such as machine learning model training data.

In some embodiments, the communication port(s) 209 may couple the computing device 200 to a network. The network can include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments can include in-body communications, various devices, and various modes of communications such as wireless communications, wired communications, and combinations of the same.

In some embodiments, the transceiver 204 and/or the communication port(s) 209 can utilize one or more communication protocols. Examples of wired protocols can include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols can include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1xRTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 206 can be any suitable display, and may display the user interface 205. For example, the user interfaces 205 can enable user interaction with the computing device 200 and/or the server 128. For example, the user interface 205 can be a user interface for an application of a network environment operator that enables a customer to view and interact with the operator's website. In some embodiments, a user can interact with the user interface 205 by engaging the input-output devices 203. In some embodiments, the display 206 can be a touchscreen, where the user interface 205 is displayed on the touchscreen.

The display 206 can include a screen such as, for example, a Liquid Crystal Display (LCD) screen, a light-emitting diode (LED) screen, an organic LED (OLED) screen, a movable display, a projection, etc. In some embodiments, the display 206 can include a coder/decoder, also known as Codecs, to convert digital media data into analog signals. For example, the visual peripheral output device can include video Codecs, audio Codecs, or any other suitable type of Codec.

The optional location device 211 may be communicatively coupled to a location network and operable to receive position data from the location network. For example, in some embodiments, the location device 211 includes a GPS device that receives position data identifying a latitude and longitude from one or more satellites of a GPS constellation. As another example, in some embodiments, the location device 211 is a cellular device that receives location data from one or more localized cellular towers. Based on the position data, the computing device 200 may determine a local geographical area (e.g., town, city, state, etc.) of its position.

In some embodiments, the computing device 200 can implement one or more modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
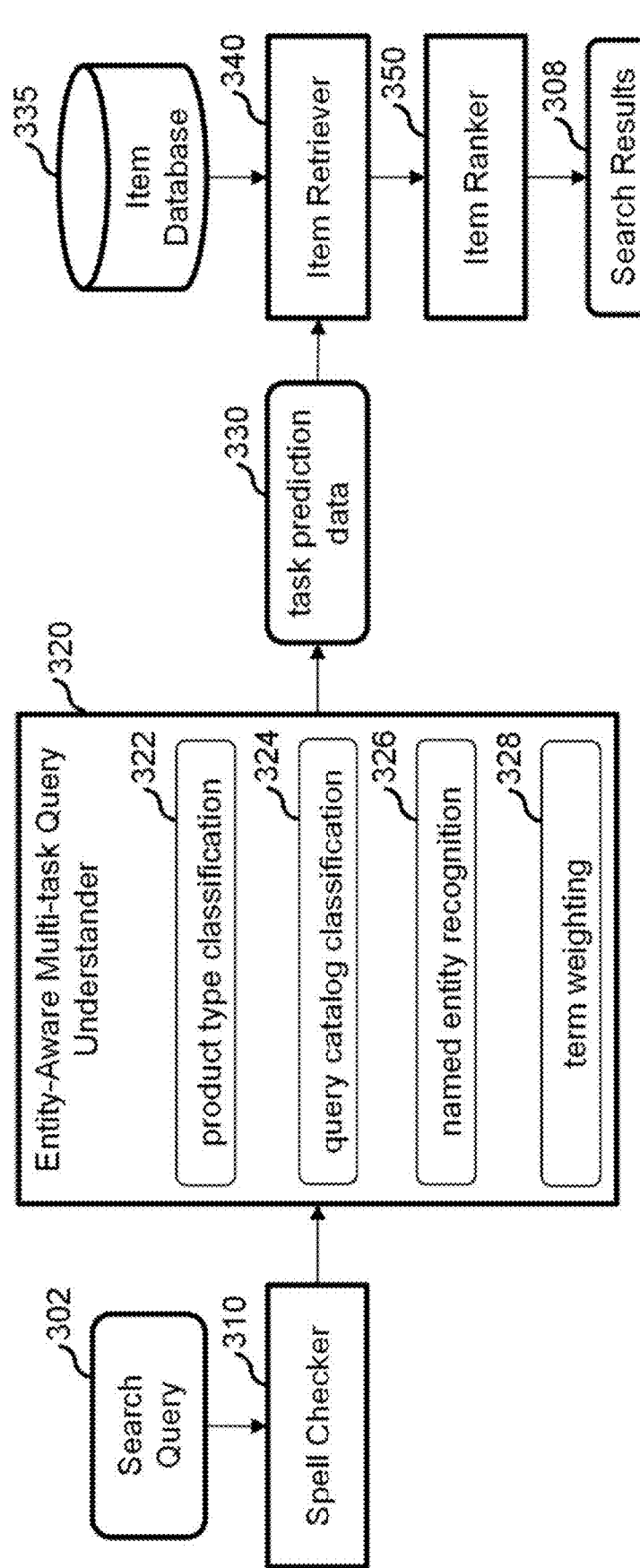
FIG. 3 is a block diagram illustrating various portions of a system for entity-aware multi-task machine learning, in accordance with some embodiments.

FIG. 3 is a block diagram illustrating various portions of a system for entity-aware multi-task machine learning, e.g. the system 100 of FIG. 1, in accordance with some embodiments. As indicated in FIG. 3, a spell checker, e.g. the spell checker 132 in the query understanding computing device 102 in FIG. 1, may receive a search query 302 and correct any spelling error in the search query 302 based on grammar rules matching a language detected from the search query 302.

After correcting the search query 302, an entity-aware multi-task query understander 320, e.g. the entity-aware multi-task query understander 134 in the query understanding computing device 102 in FIG. 1, may perform a plurality of query understanding tasks 322~328 to generate task prediction data 330 for query understanding. Query understanding can be a process of inferring the intent of a user who submitted the search query. While the process of query understanding can include the plurality of query understanding tasks 322~328, each task of the plurality of query understanding tasks 322~328 may capture one aspect of the intent of the user. In some embodiments, the user intent associated with the search query may be reflected in different aspects, e.g. a product type associated with the query, a catalog associated with the query, a named entity associated with the query, and different weights associated with different terms in the query.

In the example shown in FIG. 3, the plurality of query understanding tasks comprise: a product type classification task 322 to determine a product type for the search query; a query catalog classification task 324 to determine a query catalog for the search query; a named entity recognition task 326 to identify one or more named entities in the search query; and a term weighting task 328 to determine whether or not each token in the search query is to be excluded when retrieving a search result.

In some examples regarding the product type classification task 322, a product type may be a sentence-level multilabel classification task with multiple labels. For example, given a query of "women white button up shirt," an output of the product type classification task 322 may include a product type label of {button up shirt}. In some examples, the "women," "white," and "button up shirt" may correspond to different aspects of a user's intent in this query.

In some examples regarding the query catalog classification task 324, a query catalog is determined for the query, at a different granularity from the product type. For example, given the query of "women white button up shirt," an output of the query catalog classification task 324 may include query catalog labels of {/Clothing/Women's Clothing/Women's Tops/Women's}.

In some examples regarding the named entity recognition task 326, one or more named entities are identified in the search query and classified into predefined semantic categories, like color, size, etc. In some examples, each entity's start and end positions are indicated. The named entity recognition task 326 can be treated as a token-level multiclass classification task with multiple labels. For example, given the query of "women white button up shirt," an output of the named entity recognition task 326 may include named entity recognition labels of {gender: women, color: white, pt: button up shirt}.

In some examples regarding the term weighting task 328, it is determined whether or not each token in the search query is extraneous and should be excluded when retrieving a search result. The term weighting task 328 may be a token-level binary classification task. Instead of treating each token in the query equally, the term weighting task 328 can detect the extraneous tokens and exclude them when retrieving products. For example, given the query of "women white button up shirt," an output of the term weighting task 328 may include term weighting labels of {women: 0.95, white: 0.5, button: 0.84, up: 0.61, shirt: 0.96}.

The task prediction data 330 generated by the entity-aware multi-task query understander 320 may include all of the predicted query understanding labels of the plurality of query understanding tasks 322~328. An item retriever 340 may then take the query understanding labels as inputs and search for items from an item database 335, which may be part of the database 116 or a standalone database. An item ranker 350 may rank the items retrieved by the item retriever 340 and generate a ranked list of items as the search results 308 for the search query 302.

The accuracy and efficiency of generating the search results 308 depend a lot on the performance of the plurality of query understanding (QU) tasks 322~328.

In some embodiments, a query understanding process may include a plurality of individual tasks, including Product Type Classification (PT), Query Catalog Classification (QC), Named Entity Recognition (NER), and Term Weighting (TW). In some embodiments, each of the QU tasks utilize a same BERT-based model architecture. Each of the QU tasks apply a different task-specific network Ht and loss function $$f_{loss}^t$$

for a task t. A query q may be tokenized into a list of token pieces $q_1, q_2, \ldots, q_{m-1}, q_m$. The tokenized query q may be concatenated with a start token CLS and an end token SEP and encoded into embeddings utilizing a pre-trained BERT model fine-tuned using historical queries. The encoded embeddings, represented as $e_{CLS}, e_{q_1}, e_{q_2}, \ldots, e_{q_m}, e_{SEP}$, may be provided to a task-specific network $H_t$ to generate one or more predictions $p_t(q)$. The parameters of $H_t$ may be denoted as $W_{H_t}$.

In some embodiments, one or more prediction functions and/or loss functions may be applied by one or more models for QU tasks. For example, in some embodiments, PT may include $N_{pt}$ labels for each query q. True labels may be denoted as $y_1, y_2, \ldots, y_{N_{pt}}$ where each element of a true label is a binary indicator. In some embodiments, a multi-label prediction of a task PT may be provided by:

$$p_{pt}(q) = \text{sigmoid}\left(W_{H_{pt}}^T \cdot e_{CLS}\right), \tag{1}$$

where $p_{pt}(q)=l_1, \ldots, l_{N_{pt}}$ and $l_n$ is the probability of a query q having an $n_{th}$ label. A binary cross entropy loss may be applied as an objective shown as:

$$taskloss_{pt}(q) = -\sum_{n=1}^{N_{pt}} [y_n \cdot \log l_n + (1 - y_n) \cdot \log(1 - l_n)]. \tag{2}$$

In some embodiments, QC may have the same and/or similar architecture to PT, such that QC is represented by:

$$p_{qc}(q) = \text{sigmoid}\left(W_{H_{qc}}^T \cdot e_{CLS}\right) \tag{3}$$

$$taskloss_{qc}(q) = -\sum_{n=1}^{N_{qc}} [y_n \cdot \log l_n + (1 - y_n) \cdot \log(1 - l_n)]. \tag{4}$$

In some embodiments, a BERT tokenizer may be configured to tokenize each token into a plurality of smaller pieces or tokens. The task NER may assign each small piece a label by one or more rules, such as, for example, rules that apply: 1) a label O if an original token has the label O; or 2) I–original_Label if the original label is not O. In some embodiments, the system includes $N_{ner}$ labels. In some embodiments, each token qi in a query q has only one label ranging from 1 to $N_{ner}$. The prediction of NER may be provided by;

$$p_{ner}(q) = \text{softmax}\left(W_{H_{ner}}^T \cdot e\right), \tag{5}$$

where $e=e_{q_1}, e_{q_2}, \ldots, e_{q_{m-1}}, e_{q_m}$ and $p_{ner}(q)\in \mathbb{R}^{\ m \times N_{ner}}$. In some embodiments, $l_{i,j}$ is an element in $p_{ner}(q)$ with an ith row and jth column. A cross-entropy loss objective may be utilized as in:

$$taskloss_{ner}(q) = -\sum_{i=1}^{m} \sum_{j=1}^{N_{ner}} [\mathbb{1}(q_i, j) \cdot \log l_{i,j}], \tag{6}$$

where $\mathbb{1}(q_i, j)$ is the binary indicator (0 or 1) if a class label j is a correct classification for token $q_i$. CLS and SEP may be masked when computing a loss.

In some embodiments, as prediction of TW may be provided as:

$$p_{tw}(q) = \text{sigmoid}\left(W_{H_{tw}}^T \cdot e\right), \tag{7}$$

where $e_{q_1}, e_{q_2}, \ldots, e_{q_{m-1}}, e_{q_m}$ and $p_{tw}(q)=l_1, \ldots, l_m$. It may be assumed that $y_i$ is a true label of an ith token $q_i$ that has a prediction probability $l_i$. A binary cross-entropy objective may be utilized as in:

$$taskloss_{tw}(q) = -\sum_{i=1}^{m} [y_i \cdot \log l_i + (1 - y_i) \cdot \log(1 - l_i)]. \tag{8}$$

In some embodiments, only a first piece of a token may contribute to a loss for TW, and CLS and SEP may be masked when computing a loss.

Figure 4:
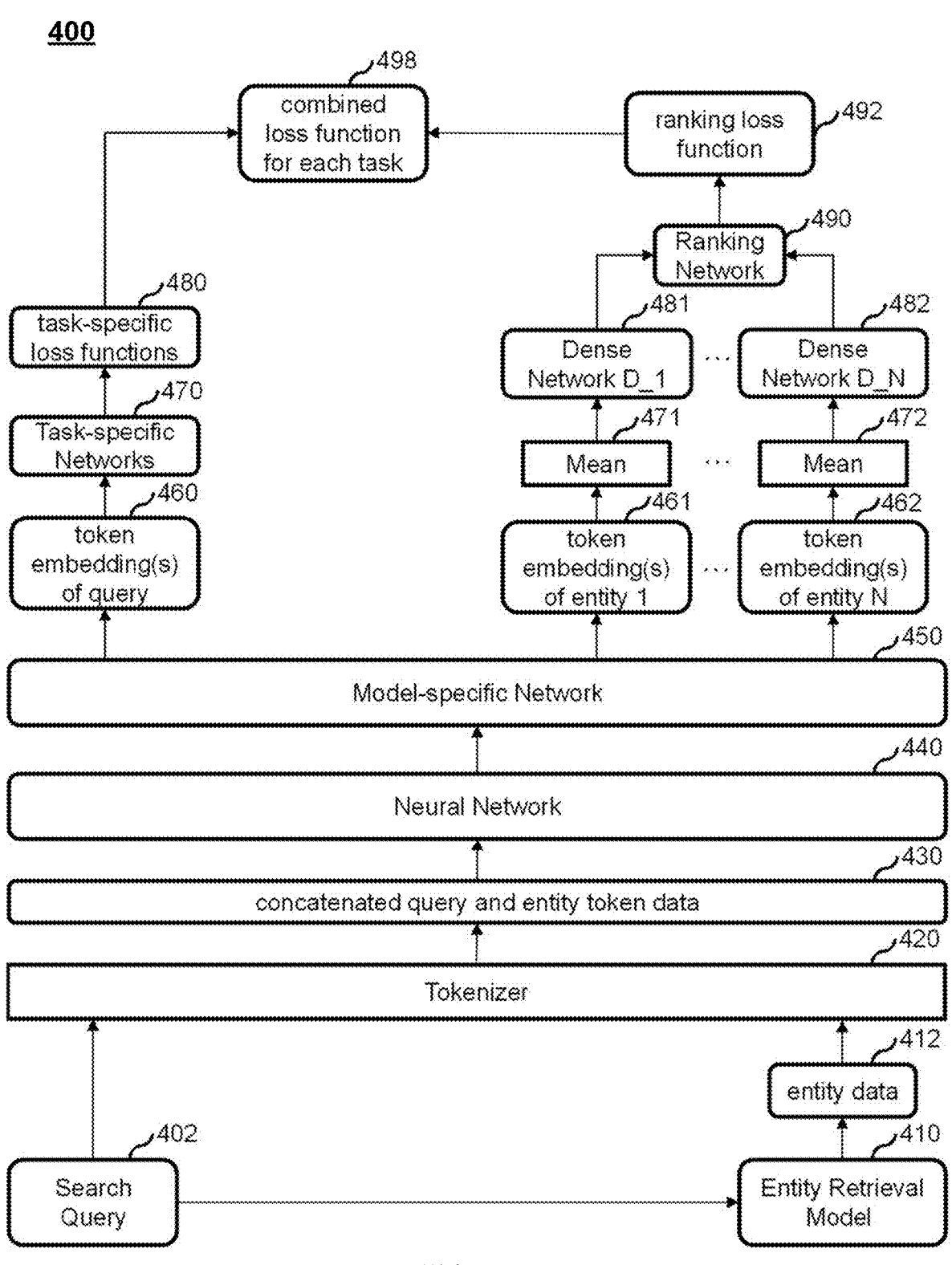
FIG. 4 illustrates an example architecture of an entity-aware multi-task query understander, in accordance with some embodiments.

FIG. 4 illustrates an example architecture of an entity-aware multi-task query understander 400, in accordance with some embodiments. In some embodiments, the entity-aware multi-task query understander 400 can be implemented as the entity-aware multi-task query understander 134 in the query understanding computing device 102 of FIG. 1.

As shown in FIG. 4, the entity-aware multi-task query understander 400 in this example includes: an entity retrieval model 410 configured to generate entity data 412 based on a search query 402, a tokenizer 420, a neural network 440, an optional model-specific network 450, and task-specific networks 470.

After obtaining the search query 402, the entity retrieval model 410 may be used to retrieve at least one entity based on the search query 402, to generate the entity data 412. In some embodiments, the tokenizer 420 may generate at least one query token based on the search query 402; and generate at least one entity token for each entity in the entity data 412. The tokenizer 420 may concatenate the at least one query token with the at least one entity token to generate concatenated token data 430 based on at least one of: a start token, a separation token or an end token.

In some embodiments, the neural network 440 may be used to generate query embedding data based on the search query and the at least one entity. For example, the neural network 440 may generate a token embedding for each token in the concatenated token data such that: (1) one or more query token embeddings 460 are generated for the search query and (2) one or more entity token embeddings 461, 462 are generated for each of N entities in the entity data 412. In some embodiments, the neural network 440 may be a BERT model.

In some embodiments, the query embedding data (including the one or more query token embeddings 460) is sent directly from the neural network 440 to each of the plurality of task-specific networks 470. In some embodiments, the query embedding data is sent from the neural network 440 to each of the plurality of task-specific networks 470 via the model-specific network 450. The model-specific network 450 includes at least one of: a shared expert network, a task-specific expert network, a shared gate network or a task-specific gate network.

In some embodiments, each of the plurality of task-specific networks 470 is configured to generate task prediction data for a different one of a plurality of query understanding tasks based on the query embedding data, while the entity retrieval model 410, the tokenizer 420 and the neural network 440 are shared and utilized by all of the plurality of query understanding tasks.

In some embodiments, during a training stage of the neural network 440 and the plurality of task-specific networks 470, only one of the plurality of task-specific networks 470 is iteratively activated during each training step of a plurality of training steps of the training stage. The entity retrieval model 410, the tokenizer 420 and the neural network 440 are activated and trained during all training steps of the training stage.

In some embodiments, during each training step for training a task-specific network associated with a corresponding task of the plurality of query understanding tasks, the entity retrieval model 410 may be used to retrieve a plurality of entities, e.g. entities 1 to N, for each query 402 in a training dataset. For each entity of the plurality of entities, the tokenizer 420 may generate entity tokens for the entity; and the neural network 440 may be configured to generate token embeddings of all entity tokens of the entity, e.g. token embeddings 461 for entity 1, . . . token embeddings 462 for entity N.

During the training stage, for each entity, an entity representation may be generated based at least in part by averaging token embeddings of all entity tokens of the entity, e.g. using a mean function 471 for the token embeddings 461 for entity 1, . . . a mean function 472 for the token embeddings 462 for entity N. Each entity representation may be compressed into a representation score for the entity using a dense network, e.g. the dense network D_1 for entity 1, . . . the dense network D_N for entity N. In addition, a ranking network 490 may be used to generate a ranking loss for each entity based on a labelled score and the representation score. In some embodiments, the labelled score for the entity may be generated by the entity retrieval model 410 based on historical user engagement data. In some embodiments, a ranking loss function 492 may be generated based on a combination of all ranking losses for the plurality of entities.

In some embodiments, in parallel to or in addition to generating the ranking loss function 492, a task-specific loss function (i.e., one of the task-specific loss functions 480) may be generated for the corresponding task (corresponding to one of the task-specific networks 470) based on a cross-entropy loss and the training dataset, during each training step of the training stage. Then for the corresponding task, a combined loss function 498 may be generated based on a weighted combination of the task-specific loss function for the corresponding task and the ranking loss function 492, using weights specific to the corresponding task. The neural network 440 and the task-specific network corresponding to the task are trained based at least in part by minimizing the combined loss function 498.

In some embodiments, context information is utilized to improve a large language model (LLM), such as a BERT model. For queries, the related entities in the engagement data, e.g., brand, may have semantic relationships with the PT, QC, and NER labels. Utilizing the entities as context may transfer knowledge to queries.

The scores of entities indicating their importance may also contain helpful information. To utilize the knowledge of entities, in some embodiments, a BERT-based model, e.g. the neural network 440, may be utilized to improve a baseline multi-task model and retrieve entities as context while utilizing the scores of entities to regularize the model.

In some examples, the search query 402 may be a query of "kung fu panda". The entity retrieval model 410 may be called to retrieve the entities "isbn=kung fu panda&pt=books" and "film=kung fu panda&pt=movie". The two entities can be concatenated by an unused token, e.g., "[unused0]" as a context. Then, the query and its context may be input into the BERT-based model to obtain the embeddings. The model-specific network $M_i$ 450 can take the embeddings and output the embeddings with the same dimensionality. Each task-specific network Ht 470 can take the embeddings from the previous step as input to compute the prediction $$p_t^i(q).$$

The token embeddings may be averaged (e.g. by mean functions 471, 472) for each entity as an entity representation and a ranking loss on the entity representations may be calculated.

In some embodiments, for a baseline multi-task model i with model-specific network $M_i$, $W_{M_i}$ denotes the parameters of $M_i$ and $W_{H_t}$ represents the parameters of task-specific network $H_T$. For a query q that can be tokenized into a list of token pieces $q_1, q_2, \ldots, q_{m-1}, q_m$, the entity retrieval model 410 may be called to retrieve entities consisting of K entities, each of which may include a score indicating its order among the entities. The retrieved entities can be shuffled, tokenized into token pieces, and concatenated by "[unused0]". The entity token pieces $c_1, c_2, \ldots, c_{n-1}, c_n$ may be concatenated as a query context $context_q$ for query q. Finally, query q and its context contextq can be concatenated by "SEP" as input of the BERT-based model to acquire the embeddings $e_{CLS}, e_{q_i}, \ldots, e_m, e_{SEP}, e_{c_1}, \ldots, e_{c_n}, e_{SEP}$.

$$P_t^i(q)$$

represents the task prediction of q for multi-task baseline model i's task t. The loss of task t may be expressed as $$taskloss_t^i.$$

The loss function of each task in the multi-task learning model may be the same as that of the single task discussed above, where the prediction functions of each task are shown as:

$$p_{pt}^i(q) = \text{sigmoid}\left(W_{H_{pt}}^T \cdot \left(M_i^T \cdot e_{CLS}\right)\right) \quad (9)$$

$$p_{qc}^i(q) = \text{sigmoid}\left(W_{H_{qc}}^T \cdot \left(M_i^T \cdot e_{CLS}\right)\right) \quad (10)$$

$$p_{ner}^i(q) = \text{softmax}\left(W_{H_{ner}}^T \cdot \left(M_i^T \cdot e\right)\right) \quad (11)$$

$$p_{tw}^i(q) = \text{sigmoid}\left(W_{H_{tw}}^T \cdot \left(M_i^T \cdot e\right)\right) \quad (12)$$

where $e = e_{q_1}, e_{q_2}, \ldots, e_{q_2}, e_{q_m}$.

In some embodiments, each entity retrieved from the entity retrieval model has a score that indicates its relative importance compared to other retrieved entities. A ranking loss may be utilized to make the model learn which entity is more important, such that the attention networks in the BERT-based model more attention to the crucial entities and better query embeddings are then learned. For example, if K entities are retrieved, the embeddings of tokens belonging to each entity may be extracted and an average of the embeddings of all the tokens within the entity may be generated (e.g. by mean functions 471, 472) as the entity representation $ent_k$. Dense network $D_k$ 481, 482 with parameters $W_{D_k}$ can compress $ent_k$ into a score $s_k$. A listwise loss may be used to calculate rankloss (entities) as shown in:

$$rankloss(\text{entities}) = \sum_{k=1}^K -\text{softmax}(y_k)\log \text{softmax}(s_k). \quad (13)$$

where $y_k$ may be a true score of the $k^{th}$ entity and a softmax function may be given as:

$$\text{softmax}(x_k) = \frac{e^{x_k}}{\sum_{k=1}^K e^{x_K}}. \quad (14)$$

A combined loss (e.g. the combined loss function 498) of task t and baseline multi-task learning model i may be determined according to:

$$loss_t^i = taskloss_t^i(q) + rankloss(\text{entities}). \quad (15)$$

In various embodiments, the entity-aware multi-task query understander 400 may be constructed based on one or more multi-task learning models such as, for example, multi-task deep neural network (MTDNN), multi-gated mixture of experts (MMoE), progressive layered extraction (PLE), etc. The entity-aware multi-task query understander 400 may use any of the foregoing models to build a different model-specific network $M_i$ 450.

Figure 5:
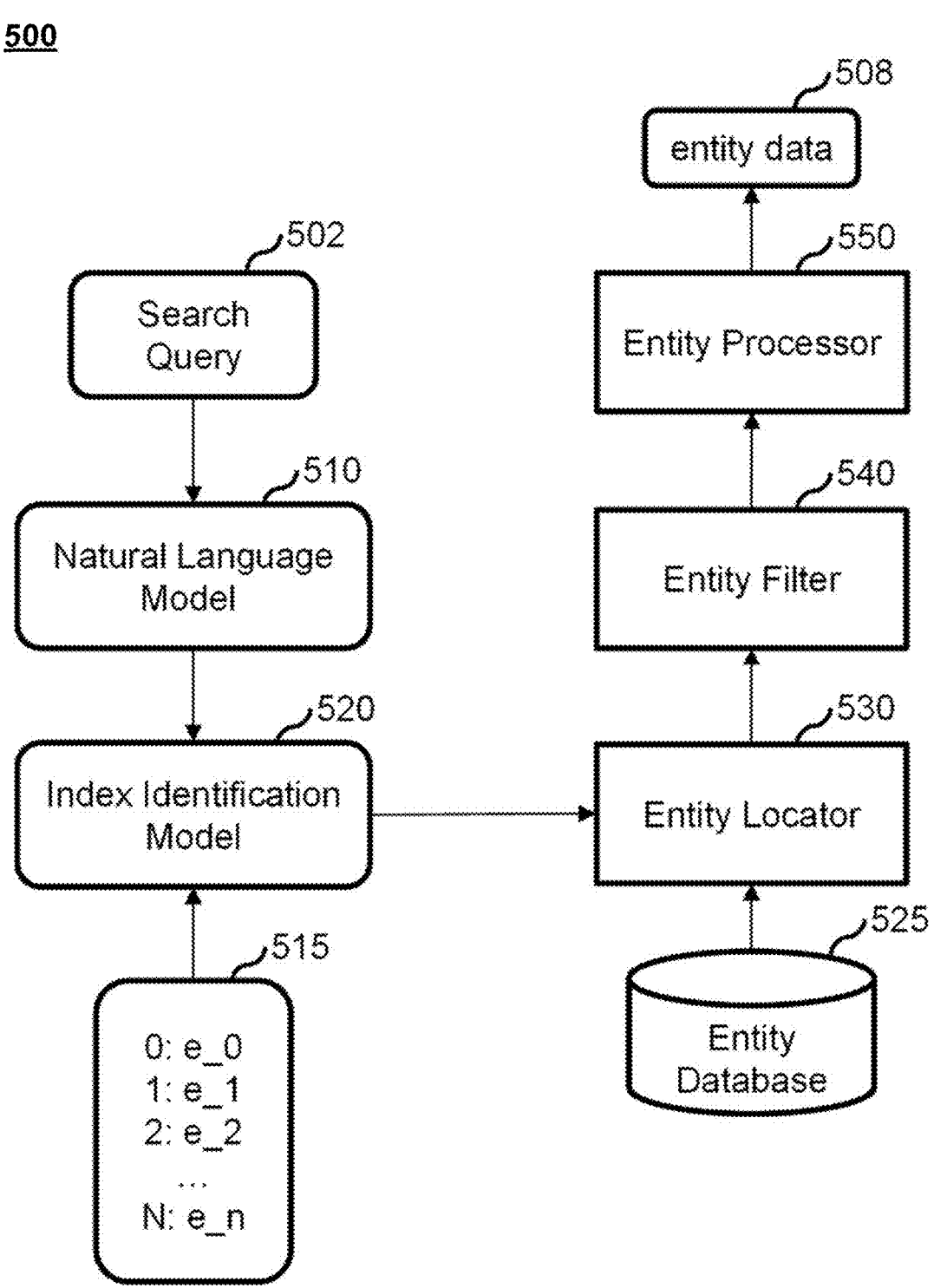
FIG. 5 illustrates an example architecture of an entity retrieval model, in accordance with some embodiments.

FIG. 5 illustrates an example architecture of an entity retrieval model 500, in accordance with some embodiments.

In some embodiments, the entity retrieval model 500 may be implemented as the entity retrieval model 410 in FIG. 4. As shown in FIG. 5, the entity retrieval model 500 includes a natural language model 510, an index identification model 520, an entity locator 530, an entity filter 540 and an entity processor 550.

In some examples, after obtaining a search query 502, the natural language model 510 may be configured to encode and normalize the search query 502 into a normalized query embedding, and send the normalized query embedding to the index identification model 520. The index identification model 520 may be configured to determine, based on the normalized query embedding, at least one index associated with at least one normalized entity embedding generated from one or more entities. For example, the index identification model 520 may perform a nearest neighbor search using the normalized query embedding to identify the at least one normalized entity embedding among a plurality of normalized entity embeddings 515.

The entity locator 530 may locate and retrieve the one or more entities from an entity database 525 based on the at least one index determined by the index identification model 520. The entity database 525 may be part of the database 116 or a standalone database.

In some examples, the entity locator 530 retrieve a plurality of entities from the entity database 525. The entity filter 540 may filter the plurality of entities based on historical user engagement data to generate a plurality of filtered entities. The entity processor 550 may process the plurality of filtered entities to generate a plurality of processed entities, such that all of the plurality of processed entities have a same format. In some embodiments, each of the plurality of processed entities is associated with a corresponding score that indicates a degree of importance of the processed entity with respect to the search query 502. In some embodiments, the entity processor 550 generates entity data 508 including the plurality of processed entities generated based on the search query 502. In some embodiments, the entity data 412 in FIG. 4 may be generated similarly as the entity data 508 in FIG. 5.

In some embodiments, the entity retrieval model 500 may be implemented as one or more of: an entity nearest neighbor (ENT-NN) model, an engagement nearest neighbor (ENG-NN) model, and/or an exact match (EXACT) model. Each of the ENT-NN, ENG-NN, and EXACT models may share a similar structure as shown in FIG. 5. In some embodiments, the index identification model 520 may utilize an open-source library based indexer to store the normalized embeddings 515 of targets encoded by the natural language model 510, which may be a sentence transformer model. Corresponding entities may be stored in an entity memory, e.g. the entity database 525. In some embodiments, each entity may be a dictionary with keys like: "entity" represents the entity type, "name" stores the entity's value, and "pt" stores a list of product types related to the entity. In various embodiments, each pt has up to ten product types concatenated by ";". When a query q comes into an entity retrieval model, it may first be encoded and normalized into an embedding $e_q$ by the same sentence transformer model. Then a nearest neighbor (NN) search may be implemented to obtain the ID's of the top k most similar targets. The entities may be located in the entity memory by the ID's. ENT-NN and ENG-NN may differ in the indexers and entity memories.

In some embodiments including an ENT-NN, a query q with M tokens is divided into $$\frac{M(M+1)}{2}$$

grams. The tokens in a gram may be concatenated into a sub-query $q_{sub}$ including m tokens. To retrieve entities for q, the longest sub-query $q_{sub}$ may be used to perform an NN search and the index identification model 520 may return ID's in response. Each returned ID may include a score of $S_{faiss}$ including a cosine similarity score between the normalized embedding of $q_{sub}$ and the retrieved normalized entity embedding. In some embodiments, the retrieved ID's with a score greater than a threshold (e.g. 0.99) may be valid. A short $q_{sub}$ may introduce noise. In some embodiments, $S_{faiss}$ may be punished by m/M. An entity score $S_{ent-NN}$ may be computed as:

$$S_{ent-nn} = S_{faiss} \times (m/M). \qquad (16)$$

An ENT-NN may enable new entities to be added to an indexer to handle unseen queries or queries with less engagement data.

In some embodiments including ENG-NN, query-entity pairs for a set of queries $q_{eng}$ are utilized. Each entity may be engaged by one or more users a number of times represented by ord. In some examples, a threshold (e.g. ord>1) may be applied to filter $q_{eng}$ to obtain a set of query-entity pairs. In some embodiments, an ENG-NN can encode $q_{eng}$ and generate an index, for fast approximate NN search. The entity memory may store corresponding entities such that each entry in the entity memory may have a list of entity dictionaries. As compared to ENT-NN's entity dictionary, ENG-NN's entity dictionary may include at least one additional key, e.g., ord. In some embodiments, the generated index cannot guarantee the retrieved set from $q_{eng}$ to be in a descending order of Cosine(q, $q_{eng}$). After retrieving a list of $q_{eng}$, an entity score $S_{eng-nn}$ may be determined according to:

$$S_{eng-nn} = \text{Cosine}(q, q_{eng}). \qquad (17)$$

In some embodiments, ENG-NN engagement queries are applied directly as a dictionary to conduct an exact match to find entities for queries. Compared to ENG-NN, an EXACT process retrieves entities with a higher precision but a lower recall. In some embodiments, the EXACT process may be utilized in conjunction with ENT-NN and/or ENG-NN, and may be applied as a baseline for comparison with ENT-NN and/or ENG-NN.

Figure 6:
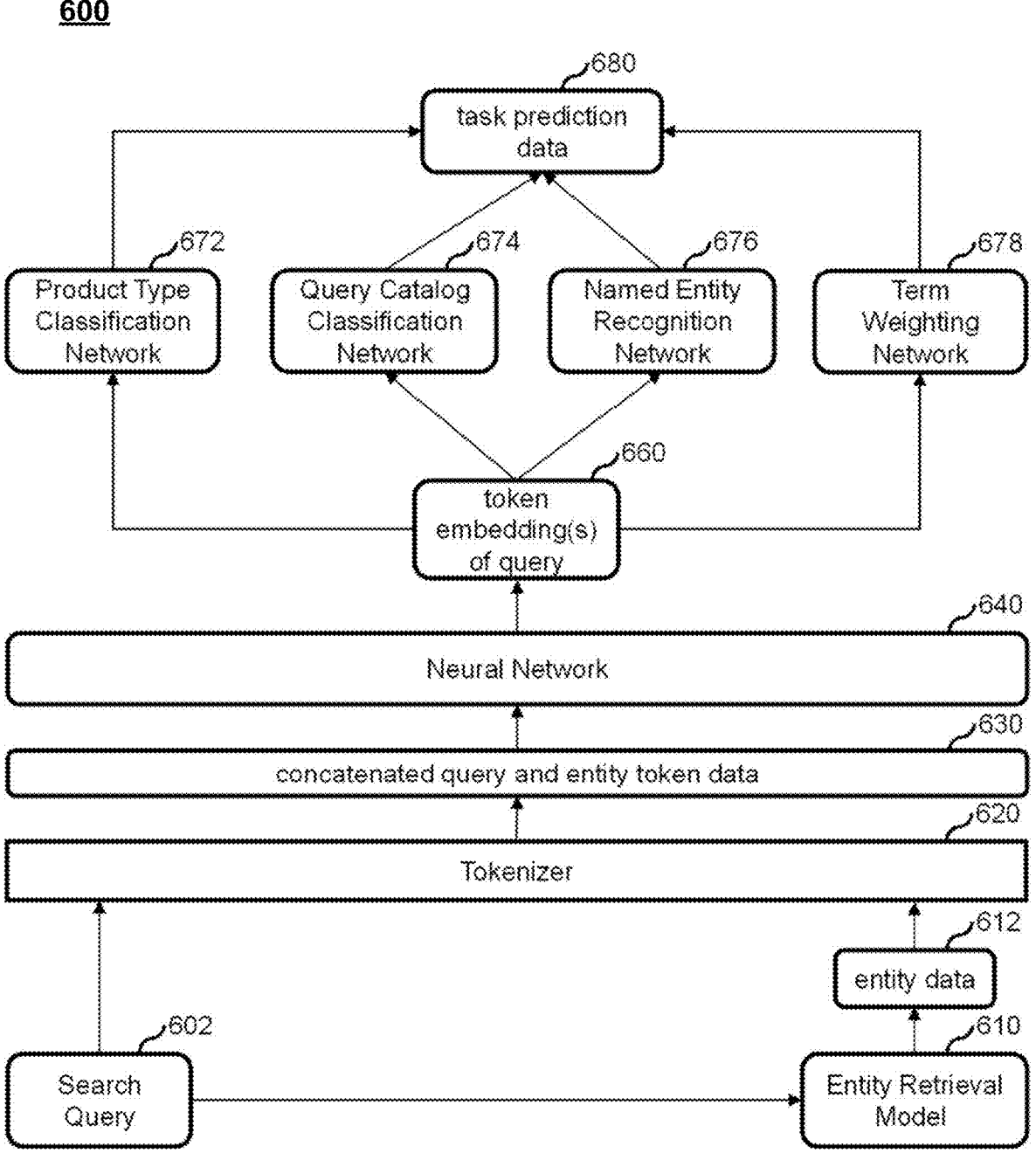
FIG. 6 illustrates an example inference process of an entity-aware multi-task query understander, in accordance with some embodiments.

FIG. 6 illustrates an example inference process 600 of an entity-aware multi-task query understander, in accordance with some embodiments. In some embodiments, the entity-aware multi-task query understander may be implemented as the entity-aware multi-task query understander 400 in FIG. 4 and/or the entity-aware multi-task query understander 134 in FIG. 1.

As shown in FIG. 6, the inference process 600 starts from obtaining a search query 602 by an entity retrieval model 610, which generates the entity data 612 based on the search query 602. The entity retrieval model 610 may have a same structure as the entity retrieval model 500 in FIG. 5 and the entity retrieval model 410 in FIG. 4. The search query 602 in the inference process 600 may be received from a user in real-time, rather than from a training dataset.

Similar to the tokenizer 420 in FIG. 4, the tokenizer 620 in FIG. 6 may generate at least one query token based on the search query 602; generate at least one entity token for each entity in the entity data 612; and concatenate the at least one query token with the at least one entity token to generate concatenated token data 630 based on at least one of: a start token, a separation token or an end token.

In some embodiments, the entity retrieval model 610, the tokenizer 620 and the neural network 640 in the inference process 600 have already been trained to have optimal hyperparameters that can minimize a combined loss function as discussed above in reference to FIG. 4. With the optimal hyperparameters, the neural network 640 can generate token embedding(s) 660 for the search query 602.

As shown in FIG. 6, the token embedding(s) 660 may be sent to each of a plurality of task-specific networks 672~678 to generate task prediction data 680 for a plurality of tasks of query understanding regarding the search query 602. In this example, the plurality of task-specific networks 672~678 includes: a product type classification network 672 configured to perform a product type classification task to determine a product type for the search query 602; a query catalog classification network 674 configured to perform a query catalog classification task to determine a query catalog for the search query 602; a named entity recognition network 676 configured to perform a named entity recognition task to identify one or more named entities in the search query 602; and a term weighting network 678 configured to perform a term weighting task to determine whether or not each token in the search query 602 is to be excluded when retrieving search results.

In some embodiments, each task of the plurality of tasks can capture a different aspect of a user intent associated with the search query 602. At least one search result may be generated for the search query 602 based on the task prediction data 680 of the plurality of tasks.

Figure 7A:
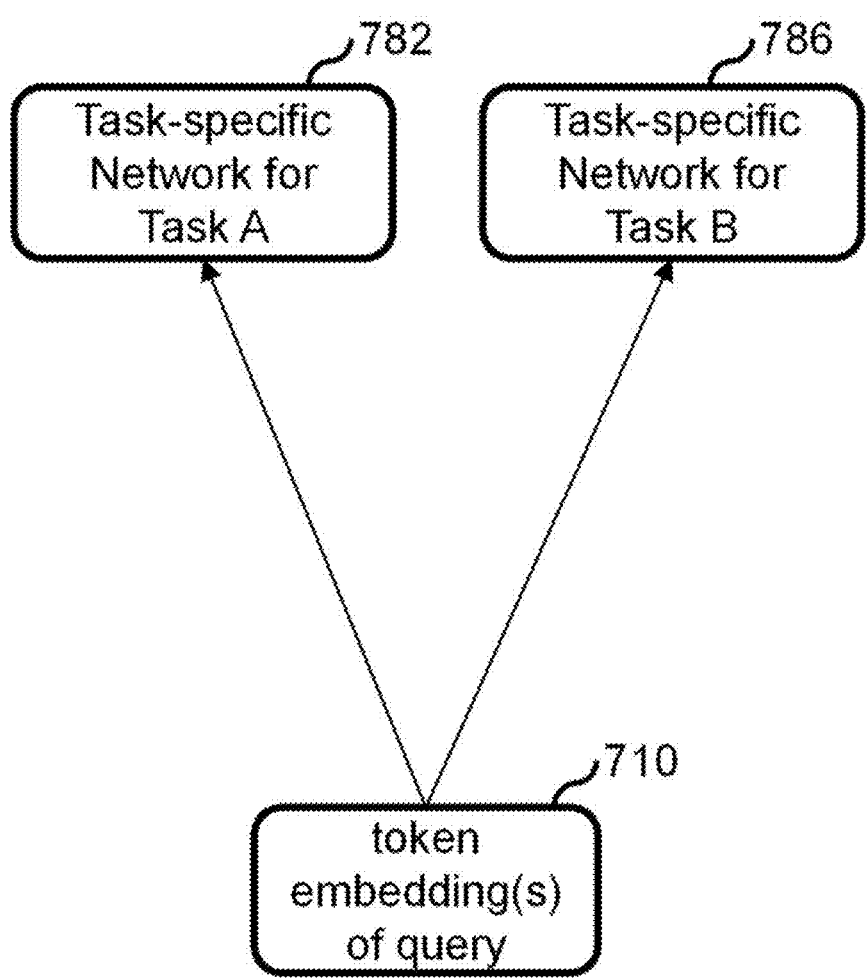
FIG. 7A illustrates an example architecture of a first model-specific network, in accordance with some embodiments.
Figure 7B:
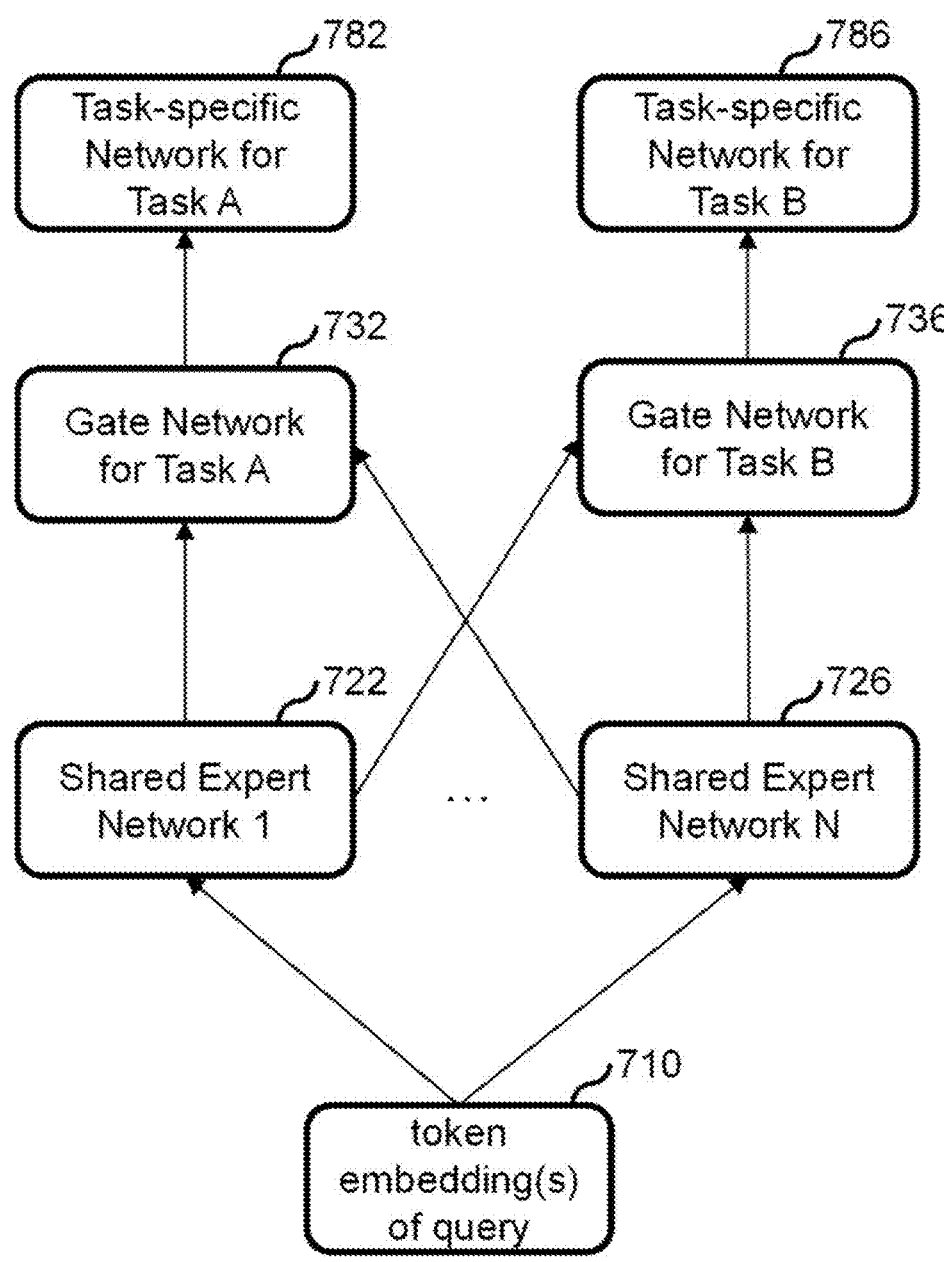
FIG. 7B illustrates an example architecture of a second model-specific network, in accordance with some embodiments.
Figure 7C:
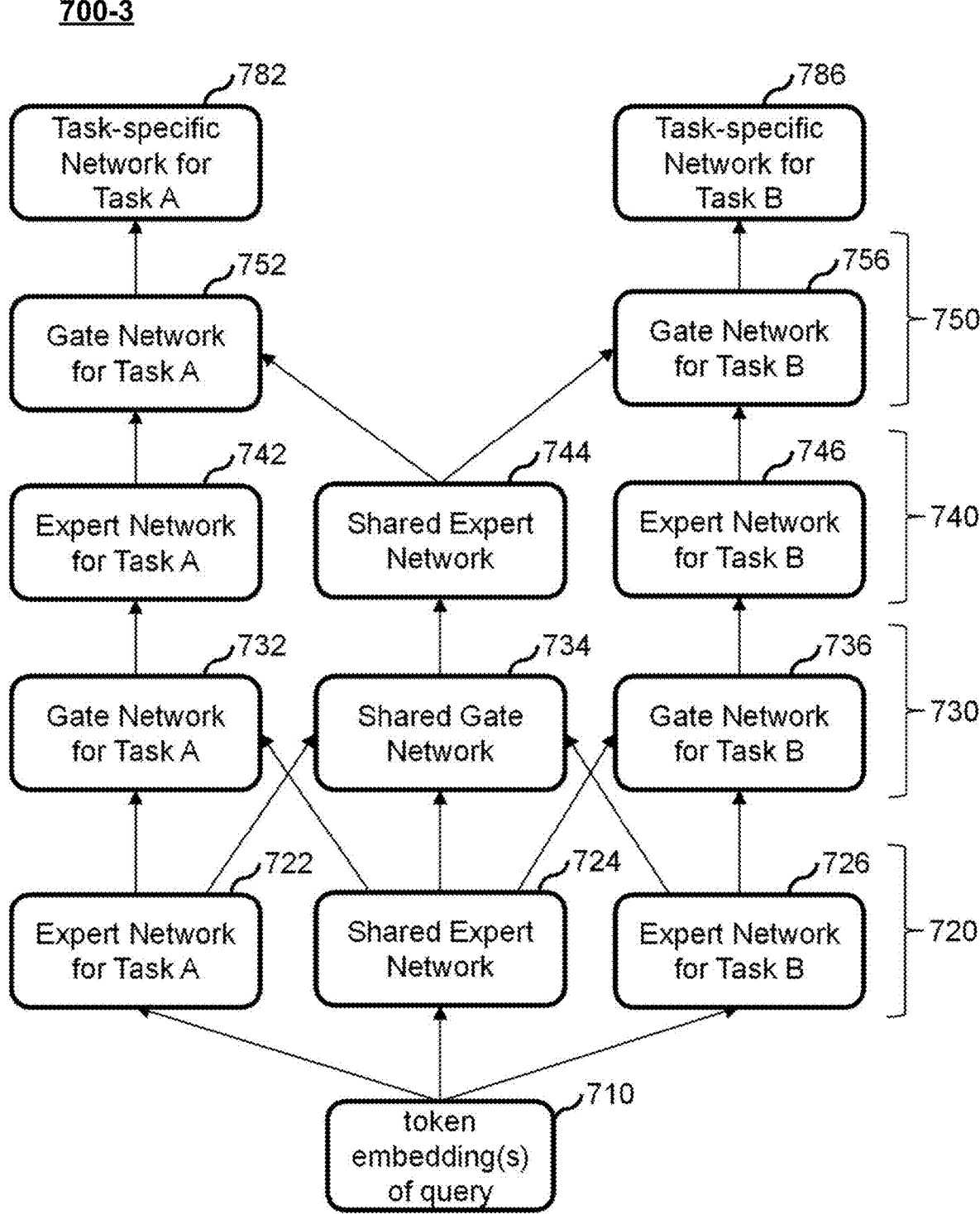
FIG. 7C illustrates an example architecture of a third model-specific network, in accordance with some embodiments.

In the example shown in FIG. 6, the token embedding(s) 660 are directly sent from the neural network 640 to the plurality of task-specific networks 672~678. In some embodiments, the token embedding(s) 660 may be sent from the neural network 640 to the plurality of task-specific networks 672~678 via a model-specific network. FIGS. 7A-7C illustrate various example model-specific networks, according to different embodiments. In some embodiments, each of these example model-specific networks may be implemented as the model-specific network 450 in FIG. 4. While only two tasks A and B are illustrated in FIGS. 7A-7C, it will be appreciated that each of the example model-specific networks in FIGS. 7A-7C may process any number of tasks.

FIG. 7A illustrates an example architecture of a first model-specific network 700-1, in accordance with some embodiments. The first model-specific network 700-1 may correspond to a multi-task deep neural network (MTDNN) model, where token embedding(s) 710 of a query are directly sent to a task-specific network 782 for task A and a task-specific network 786 for task B.

FIG. 7B illustrates an example architecture of a second model-specific network 700-2, in accordance with some embodiments. The second model-specific network 700-2 may correspond to a multi-gated mixture of experts (MMoE) model, where the token embedding(s) 710 of the query are first sent to a plurality of shared expert networks (including a shared expert network 1 722 . . . a shared expert network N 726). The output from each of the plurality of shared expert networks 722~726 is sent to a gate network 732 for task A and to a gate network 736 for task B. The gate network 732 for task A can send data merely to the task-specific network 782 for task A; and the gate network 736 for task B can send data merely to the task-specific network 786 for task B. During training, all of the shared networks are activated all the time. For each training step, specific networks for one of the two tasks may be activated iteratively.

FIG. 7C illustrates an example architecture of a third model-specific network 700-3, in accordance with some embodiments. The third model-specific network 700-3 may correspond to a progressive layered extraction (PLE) model, where the token embedding(s) 710 of the query are first sent to layer 720 including: an expert network 722 specific to task A, a shared expert network 724, and an expert network 726 specific to task B.

The next layer 730 of the third model-specific network 700-3 includes: a gate network 732 specific to task A, a shared gate network 734, and a gate network 736 specific to task B. The output from the expert network 722 specific to task A is sent to the gate network 732 specific to task A and to the shared gate network 734. The output from the expert network 726 specific to task B is sent to the gate network 736 specific to task B and to the shared gate network 734. The output from the shared expert network 724 is sent to all networks in the layer 730.

The next layer 740 of the third model-specific network 700-3 includes: an expert network 742 specific to task A, a shared expert network 744, and an expert network 746 specific to task B. The output from the gate network 732 specific to task A is merely sent to the expert network 742 specific to task A. The output from the gate network 736 specific to task B is merely sent to the expert network 746 specific to task B. The output from the shared gate network 734 is merely sent to the shared expert network 744.

The next layer 750 of the third model-specific network 700-3 includes: a gate network 752 specific to task A and a gate network 756 specific to task B. The output from the expert network 742 specific to task A is merely sent to the gate network 752 specific to task A. The output from the expert network 746 specific to task B is merely sent to the gate network 756 specific to task B. The output from the shared expert network 744 is sent to both the gate network 752 specific to task A and the gate network 756 specific to task B.

The gate network 752 specific to task A can send data merely to the task-specific network 782 for task A; and the gate network 756 specific to task B can send data merely to the task-specific network 786 for task B. During training, all of the shared networks in the third model-specific network 700-3 can be activated all the time. For each training step, specific networks in the third model-specific network 700-3 for one of the two tasks may be activated iteratively.

FIG. 8 shows a flowchart illustrating an example method 800 for query understanding using entity-aware multi-task machine learning, in accordance with some embodiments. In some embodiments, the method 800 can be carried out by a system including one or more computing devices, such as the query understanding computing device 102 and/or the cloud-based engine 121 of FIG. 1. Beginning at operation 810, a search query is obtained. At operation 820, at least one entity is retrieved based on the search query using an entity retrieval model. At operation 830, query embedding data is generated, using a neural network, based on the search query and the at least one entity. At operation 840, task prediction data is generated, using a plurality of task-specific networks, for a plurality of tasks based on the query embedding data. Each task of the plurality of tasks may capture a different aspect of a user intent associated with the search query. At operation 850, at least one search result may be generated for the search query based on the task prediction data for the plurality of tasks.

FIG. 9 shows a flowchart illustrating an example method 900 for retrieving at least one entity, in accordance with some embodiments. In some embodiments, the method 900 can be carried out by a system including one or more computing devices, such as the query understanding computing device 102 and/or the cloud-based engine 121 of FIG. 1. In some embodiments, the method 900 can be performed as part of the operation 820 of the example method 800 in FIG. 8. Beginning at operation 902, the search query is encoded and normalized into a normalized query embedding. At operation 904, at least one index is determined based on the normalized query embedding. The at least one index is associated with at least one normalized entity embedding generated from one or more entities, and may be determined based on a nearest neighbor search performed using the normalized query embedding to identify the at least one normalized entity embedding among a plurality of normalized entity embeddings. At operation 906, the one or more entities are located and retrieved from an entity database based on the at least one index.

FIG. 10 shows a flowchart illustrating an example method 1000 for generating a plurality of processed entities, in accordance with some embodiments. In some embodiments, the method 1000 can be carried out by a system including one or more computing devices, such as the query understanding computing device 102 and/or the cloud-based engine 121 of FIG. 1. In some embodiments, the method 1000 can be performed as part of the operation 820 of the example method 800 in FIG. 8. Beginning at operation 1010, a plurality of entities are filtered based on historical user engagement data to generate a plurality of filtered entities. At operation 1020, the plurality of filtered entities are processed to generate a plurality of processed entities. In some embodiments, the plurality of processed entities are generated such that: all of the plurality of processed entities have a same format 1022, each of the plurality of processed entities is associated with a corresponding score that indicates a degree of importance of the processed entity with respect to the search query 1024, and the at least one entity comprises the plurality of processed entities generated based on the search query 1026.

FIG. 11 shows a flowchart illustrating an example method 1100 for generating query embedding data, in accordance with some embodiments. In some embodiments, the method 1100 can be carried out by a system including one or more computing devices, such as the query understanding computing device 102 and/or the cloud-based engine 121 of FIG. 1. In some embodiments, the method 1100 can be performed as part of the operation 830 of the example method 800 in FIG. 8. Beginning at operation 1110, at least one query token is generated based on the search query. At operation 1120, a plurality of entity tokens is generated based on the plurality of processed entities. At operation 1130, the at least one query token is concatenated with the plurality of entity tokens to generate concatenated token data based on at least one of: a start token, a separation token or an end token. At operation 1140, a token embedding is generated for each token in the concatenated token data such that: (1) one or more query token embeddings are generated for the search query and (2) a plurality of entity token embeddings are generated for the plurality of processed entities. The query embedding data for the search query may include the one or more query token embeddings.

FIG. 12 depicts an example system 1200 (e.g. a computing device) for entity-aware multi-task machine learning, including a machine-readable medium 1204 encoded with example instructions executable by processing resource 1202, e.g. hardware processors, in accordance with some embodiments. In some implementations, the system 1200 may be useful for implementing aspects of the query understanding computing device 102 of FIG. 1. In some implementations, functionality described with respect to FIG. 1 may be included in the instructions encoded on machine-readable medium 1204.

The processing resource 1202 may include a microcontroller, a microprocessor, central processing unit core(s), an ASIC, an FPGA, and/or other hardware device suitable for retrieval and/or execution of instructions from the machine-readable medium 1204 to perform functions related to various examples. Additionally or alternatively, the processing resource 1202 may include or be coupled to electronic circuitry or dedicated logic for performing some or all of the functionality of the instructions described herein.

The machine-readable medium 1204 may be any medium suitable for storing executable instructions, such as RAM, ROM, EEPROM, flash memory, a hard disk drive, an optical disc, or the like. In some example implementations, the machine-readable medium 1204 may be a tangible, non-transitory medium. The machine-readable medium 1204 may be disposed within the system 1200 in which case the executable instructions may be deemed installed or embedded on the system. Alternatively, the machine-readable medium 1204 may be a portable (e.g., external) storage medium, and may be part of an installation package.

As described further herein below, the machine-readable medium 1204 may be encoded with a set of executable instructions. It should be understood that part or all of the executable instructions and/or electronic circuits included within one box may, in alternate implementations, be included in a different box shown in the figures or in a different box not shown. Some implementations may include more or fewer instructions than are shown in FIG. 12.

The machine-readable medium 1204 includes instructions 1206-1214. Instructions 1206, when executed, cause the processing resource 1202 to obtain a search query. The instructions 1208, when executed, cause the processing resource 1202 to retrieve, using an entity retrieval model, at least one entity based on the search query. The instructions 1210, when executed, cause the processing resource 1202 to generate, using a neural network, query embedding data based on the search query and the at least one entity.

The instructions 1212, when executed, cause the processing resource 1202 to generate, using a plurality of task-specific networks, task prediction data for a plurality of tasks based on the query embedding data. Each task of the plurality of tasks captures a different aspect of a user intent associated with the search query. The instructions 1214, when executed, cause the processing resource 1202 to generate at least one search result for the search query based on the task prediction data for the plurality of tasks.

Although the methods described above are with reference to the illustrated flowcharts, it will be appreciated that many other ways of performing the acts associated with the methods can be used. For example, the order of some operations may be changed, and some of the operations described may be optional.

The methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of example embodiments, it is not limited thereto. Rather, the appended claims should be construed broadly, to include other variants and embodiments, which can be made by those skilled in the art.

What is claimed is:

1. A system, comprising:
a processor; and
a non-transitory memory storing instructions, that when executed, cause the processor to:
obtain a search query,
using an entity retrieval model:
encode the search query into a normalized query embedding using a natural language model of the entity retrieval model,
identify at least one normalized entity embedding among a plurality of normalized entity embeddings using the normalized query embedding,
determine at least one index associated with the at least one normalized entity embedding,
locate and retrieve a plurality of entities from an entity database based on the at least one index, filter the plurality of entities based on historical user engagement data to generate a plurality of filtered entities, and process the plurality of filtered entities to generate at least one entity based on the search query, generate, using a neural network, query embedding data based on the search query and the at least one entity, generate, using a plurality of task-specific networks, task prediction data for a plurality of tasks based on the query embedding data, wherein each task of the plurality of tasks captures a different aspect of a user intent associated with the search query, and generate at least one search result for the search query based on the task prediction data for the plurality of tasks.

2. The system of claim 1, wherein the at least one entity is generated based at least in part by:

based on a nearest neighbor search performed using the normalized query embedding identifying the at least one normalized entity embedding among thes plurality of normalized entity embeddings.

3. The system of claim 2, wherein:

the processor is further caused to:

process the plurality of filtered entities to generate a plurality of processed entities, wherein:

all of the plurality of processed entities have a same format, each of the plurality of processed entities is associated with a corresponding score that indicates a degree of importance of the processed entity with respect to the search query, and the at least one entity comprises the plurality of processed entities generated based on the search query.

4. The system of claim 3, wherein the query embedding data is generated based at least in part by:

generating at least one query token based on the search query;

generating a plurality of entity tokens based on the plurality of processed entities;

concatenating the at least one query token with the plurality of entity tokens to generate concatenated token data based on at least one of: a start token, a separation token or an end token; and generating a token embedding for each token in the concatenated token data such that: (1) one or more query token embeddings are generated for the search query and (2) a plurality of entity token embeddings are generated for the plurality of processed entities, wherein the query embedding data for the search query includes the one or more query token embeddings.

5. The system of claim 4, wherein the processor is further caused to:

send the query embedding data from the neural network to each of the plurality of task-specific networks via a model-specific network, wherein the model-specific network includes at least one of: a shared expert network, a task-specific expert network, a shared gate network or a task-specific gate network.

6. The system of claim 1, wherein during a training stage of the neural network and the plurality of task-specific networks:

only one of the plurality of task-specific networks is activated during each training step of a plurality of training steps of the training stage; and the neural network is activated and trained during all training steps of the training stage.

7. The system of claim 6, wherein during each training step for training a task-specific network associated with a corresponding task, the processor is caused to:

retrieve a plurality of entities for each query in a training dataset using the entity retrieval model;

for each entity of the plurality of entities:

generate an entity representation based at least in part by averaging token embeddings of all entity tokens of the entity, compress the entity representation into a representation score for the entity using a dense network, determine a labelled score for the entity, wherein the labelled score is generated by the entity retrieval model based on historical user engagement data, and generate a ranking loss for the entity based on the labelled score and the representation score;

generate a ranking loss function based on a combination of all ranking losses for the plurality of entities;

generate a task loss function for the corresponding task based on a cross-entropy loss and the training dataset;

generate, for the corresponding task, a combined loss function based on a weighted combination of the task loss function for the corresponding task and the ranking loss function, using weights specific to the corresponding task; and train the neural network and the task-specific network based at least in part by minimizing the combined loss function.

8. The system of claim 1, wherein the plurality of tasks comprises at least one of:

a product type classification task to determine a product type for the search query;

a query catalog classification task to determine a query catalog for the search query;

a named entity recognition task to identify one or more named entities in the search query; or a term weighting task to determine whether or not each token in the search query is to be excluded when retrieving a search result.

9. A computer-implemented method, comprising:

obtaining a search query;

using an entity retrieval model:

encoding the search query into a normalized query embedding using a natural language model of the entity retrieval model, identifying at least one normalized entity embedding among a plurality of normalized entity embeddings using the normalized query embedding, determining at least one index associated with the at least one normalized entity embedding localing and retrieving a plurality of entities from an entity database based on the at least one index filtering the plurality of entities based on historical user engagement data to generate a plurality of filtered entities, and process the plurality of filtered entities to generate at least one entity based on the search query;

generating, using a neural network, query embedding data based on the search query and the at least one entity;

generating, using a plurality of task-specific networks, task prediction data for a plurality of tasks based on the query embedding data, wherein each task of the plurality of tasks captures a different aspect of a user intent associated with the search query; and generating at least one search result for the search query based on the task prediction data for the plurality of tasks.

10. The computer-implemented method of claim 9, wherein generating the at least one entity comprises:

based on a nearest neighbor search embedding performed using the normalized query embedding, identifying the at least one normalized entity embedding among the plurality of normalized entity embeddings.

11. The computer-implemented method of claim 10, wherein:

processing the plurality of filtered entities to generate a plurality of processed entities, wherein:

all of the plurality of processed entities have a same format, each of the plurality of processed entities is associated with a corresponding score that indicates a degree of importance of the processed entity with respect to the search query, and the at least one entity comprises the plurality of processed entities generated based on the search query.

12. The computer-implemented method of claim 11, wherein generating the query embedding data comprises:

generating at least one query token based on the search query;

generating a plurality of entity tokens based on the plurality of processed entities;

concatenating the at least one query token with the plurality of entity tokens to generate concatenated token data based on at least one of: a start token, a separation token or an end token; and generating a token embedding for each token in the concatenated token data such that: (1) one or more query token embeddings are generated for the search query and (2) a plurality of entity token embeddings are generated for the plurality of processed entities, wherein the query embedding data for the search query includes the one or more query token embeddings.

13. The computer-implemented method of claim 12, further comprising:

sending the query embedding data from the neural network to each of the plurality of task-specific networks via a model-specific network, wherein the model-specific network includes at least one of: a shared expert network, a task-specific expert network, a shared gate network or a task-specific gate network.

14. The computer-implemented method of claim 9, wherein during a training stage of the neural network and the plurality of task-specific networks:

only one of the plurality of task-specific networks is activated during each training step of a plurality of training steps of the training stage; and the neural network is activated and trained during all training steps of the training stage.

15. A non-transitory computer readable medium having instructions stored thereon, wherein the instructions, when executed by at least one processor, cause at least one device to perform operations comprising:

obtaining a search query;

using an entity retrieval model:

encoding the search query into a normalized query embedding using a natural language model of the entity retrieval model, identifying at least one normalized entity embedding among a plurality of normalized entity embeddings using the normalized query embedding, determining at least one index associated with the at least one normalized entity embedding, locating and retrieving a plurality of entities from an entity database based on the at least one index, filtering the plurality of entities based on historical user engagement data to generate a plurality of filtered entities, and process the plurality of filtered entities to generate at least one entity based on the search query;

generating, using a neural network, query embedding data based on the search query and the at least one entity;

generating, using a plurality of task-specific networks, task prediction data for a plurality of tasks based on the query embedding data, wherein each task of the plurality of tasks captures a different aspect of a user intent associated with the search query; and generating at least one search result for the search query based on the task prediction data for the plurality of tasks.

16. The non-transitory computer readable medium of claim 15, wherein generating the operations further comprises:

based on a nearest neighbor search performed using the normalized query embedding identifying the at least one normalized entity embedding among the plurality of normalized entity embeddings.

17. The non-transitory computer readable medium of claim 16, wherein the operations further comprise:

processing the plurality of filtered entities to generate a plurality of processed entities, wherein:

all of the plurality of processed entities have a same format, each of the plurality of processed entities is associated with a corresponding score that indicates a degree of importance of the processed entity with respect to the search query, and the at least one entity comprises the plurality of processed entities generated based on the search query.

18. The non-transitory computer readable medium of claim 17, wherein generating the query embedding data comprises:

generating at least one query token based on the search query;

generating a plurality of entity tokens based on the plurality of processed entities;

concatenating the at least one query token with the plurality of entity tokens to generate concatenated token data based on at least one of: a start token, a separation token or an end token; and generating a token embedding for each token in the concatenated token data such that: (1) one or more query token embeddings are generated for the search query and (2) a plurality of entity token embeddings are generated for the plurality of processed entities, wherein the query embedding data for the search query includes the one or more query token embeddings.

19. The non-transitory computer readable medium of claim 18, wherein the operations further comprise:

sending the query embedding data from the neural network to each of the plurality of task-specific networks via a model-specific network, wherein the model-specific network includes at least one of: a shared expert network, a task-specific expert network, a shared gate network or a task-specific gate network.

20. The non-transitory computer readable medium of claim 15, wherein during a training stage of the neural network and the plurality of task-specific networks:

only one of the plurality of task-specific networks is activated during each training step of a plurality of training steps of the training stage; and the neural network is activated and trained during all training steps of the training stage.

* * * * *